US008810633B2

(12) United States Patent
Leung et al.

(10) Patent No.: US 8,810,633 B2
(45) Date of Patent: Aug. 19, 2014

(54) ROBUST IMAGE ALIGNMENT FOR DISTRIBUTED MULTI-VIEW IMAGING SYSTEMS

(75) Inventors: Ka-Ming Leung, Marsfield (AU); Zhonghua Ma, North Epping (AU)

(73) Assignee: Canon Kabushiki Kaisha, Tokyo (JP)

( * ) Notice: Subject to any disclaimer, the term of this patent is extended or adjusted under 35 U.S.C. 154(b) by 310 days.

(21) Appl. No.: 12/955,370

(22) Filed: Nov. 29, 2010

(65) Prior Publication Data

US 2011/0128353 A1    Jun. 2, 2011

(30) Foreign Application Priority Data

Nov. 30, 2009  (AU) .................................. 2009243439

(51) Int. Cl.
*H04N 13/02* (2006.01)
*H04N 7/26* (2006.01)
*H04N 7/32* (2006.01)

(52) U.S. Cl.
CPC ... *H04N 19/00466* (2013.01); *H04N 19/00569* (2013.01); *H04N 19/00769* (2013.01)
USPC .......................................................... 348/47

(58) Field of Classification Search
USPC .......................................................... 348/47
See application file for complete search history.

(56) References Cited

U.S. PATENT DOCUMENTS

| 4,718,067 | A | * | 1/1988 | Peters | 714/747 |
| 5,003,541 | A | * | 3/1991 | Mester | 714/767 |
| 5,565,930 | A | * | 10/1996 | Bolger et al. | 348/572 |
| 6,055,012 | A | * | 4/2000 | Haskell et al. | 348/48 |
| 6,137,902 | A | * | 10/2000 | Kinoshita et al. | 382/154 |
| 6,198,852 | B1 | * | 3/2001 | Anandan et al. | 382/284 |
| RE37,668 | E | * | 4/2002 | Etoh | 382/251 |
| 6,490,364 | B2 | * | 12/2002 | Hanna et al. | 382/107 |
| 6,546,120 | B1 | * | 4/2003 | Etoh et al. | 382/107 |

(Continued)

FOREIGN PATENT DOCUMENTS

| EP | 1 927 934 A2 | 6/2008 |
| WO | WO 2008/048473 A2 | 4/2008 |

OTHER PUBLICATIONS

Liu, Backward Channel Aware Distributed Video Coding, 2007, Purdue University, A Dissertation, pp. 141.*

(Continued)

*Primary Examiner* — Sath V Perungavoor
*Assistant Examiner* — Peter D Le
(74) *Attorney, Agent, or Firm* — Fitzpatrick, Cella, Harper & Scinto

(57) ABSTRACT

Disclosed is a method of image coding for joint decoding of images from different viewpoints using distributed coding techniques. The method receives a first set of features (205) and error correction bits (203) corresponding to a first image (201) obtained at a first viewpoint (122) and a second set of features (425) from a second image (254, 415) corresponding to a second viewpoint (124). An approximation (437) of said first image (201) at said first viewpoint (122) is determined (432, 434, 436) an based on the first and second sets of features (205, 425) and the second image at the second viewpoint. A reliability measure (445) of the approximation of the first image is then determined (450) by joint decoding (438) the approximation (437) using the error correction bits (203). The approximation of the first image is then refined iteratively (460, 438) based on the reliability measure (445) and image information (448) derived from the joint decoding.

20 Claims, 11 Drawing Sheets

(56) References Cited

U.S. PATENT DOCUMENTS

| | | | |
|---|---|---|---|
| 6,765,865 B1* | 7/2004 | Rayner et al. | 370/228 |
| 7,388,521 B2* | 6/2008 | Lu et al. | 341/51 |
| 7,412,427 B2* | 8/2008 | Zitnick et al. | 706/20 |
| 8,255,763 B1* | 8/2012 | Yang et al. | 714/755 |
| 2002/0146074 A1* | 10/2002 | Ariel et al. | 375/240.27 |
| 2004/0098224 A1* | 5/2004 | Takahashi | 702/181 |
| 2004/0151365 A1* | 8/2004 | An Chang et al. | 382/154 |
| 2006/0023950 A1* | 2/2006 | Auberger et al. | 382/232 |
| 2006/0082644 A1* | 4/2006 | Tsubaki | 348/42 |
| 2006/0146143 A1* | 7/2006 | Xin et al. | 348/218.1 |
| 2007/0041444 A1* | 2/2007 | Gutierrez Novelo | 375/240.15 |
| 2007/0086645 A1* | 4/2007 | Kim et al. | 382/154 |
| 2007/0174633 A1 | 7/2007 | Draper et al. | 713/186 |
| 2008/0144124 A1 | 6/2008 | Samadani et al. | 358/453 |
| 2008/0172384 A1* | 7/2008 | Cai et al. | 707/6 |
| 2008/0235515 A1 | 9/2008 | Yedidia et al. | 713/186 |
| 2008/0279281 A1* | 11/2008 | Draper et al. | 375/240.22 |
| 2008/0285654 A1* | 11/2008 | Cai et al. | 375/240.16 |
| 2009/0003452 A1* | 1/2009 | Au et al. | 375/240.17 |
| 2009/0296826 A1* | 12/2009 | Pandit et al. | 375/240.25 |
| 2010/0020884 A1* | 1/2010 | Pandit et al. | 375/240.25 |
| 2010/0034293 A1* | 2/2010 | Lin et al. | 375/240.25 |
| 2010/0166074 A1* | 7/2010 | Ho et al. | 375/240.16 |
| 2010/0232500 A1 | 9/2010 | Lakus-Becker et al. | 375/240.12 |
| 2010/0239003 A1 | 9/2010 | Lakus-Becker et al. | 375/240.12 |
| 2010/0271462 A1* | 10/2010 | Gutierrez Novelo | 348/43 |
| 2010/0271511 A1 | 10/2010 | Ma et al. | 348/239 |
| 2010/0309988 A1 | 12/2010 | Lakus-Becker et al. | 375/240.27 |
| 2010/0316137 A1 | 12/2010 | Long et al. | 375/240.27 |
| 2011/0279644 A1* | 11/2011 | Suh et al. | 348/43 |

OTHER PUBLICATIONS

San et al., Multiview Image Coding Based on Geometric Prediction, Nov. 2007, IEEE Transactions on Circuits and Systems, vol. 17, No. 11.*

Artigas et al., Side Information Generation for Multiview Distributed Video Coding Using a Fusion Approach, 2006, Technical University of Catalonia (UPC), Dept. of Signal Theory & Communications, pp. 1-4.*

* cited by examiner

ROBUST IMAGE ALIGNMENT FOR DISTRIBUTED MULTI-VIEW IMAGING SYSTEMS

TECHNICAL FIELD

The present invention relates generally to image encoding and decoding and, in particular, to the generation of inter-view prediction of a distributed multi-view imaging system.

BACKGROUND

Multi-view images (and videos) typically refer to a set of overlapped images capturing a scene from different view positions. One or more cameras can be employed to take multi-view images. One common approach in compressing multi-view images is to encode the images (and videos) from different viewpoints independently. However, this approach does not exploit the correlation between different views and often results in an enormous amount of redundant data to be transmitted, or stored in a storage device. An alternative approach is to take advantage of the inter-view correlation when encoding. With this encoding approach, an encoder reads the captured images from all different viewpoints and performs inter-view predictive coding on the captured images. This coding scheme can achieve high coding efficiency at the expense of a high computational complexity encoder.

Wyner-Ziv coding, or "distributed video coding", has recently been extended to stereo and multi-view imaging to address the shortcomings of conventional coding approaches. In a distributed video coding (DVC) scheme, the complexity is shifted from the encoder to the decoder. Typically, the set of input images captured at different viewpoints at the same time instant is usually split into two subsets. The first subset of images has at least one image and is compressed using a conventional coding scheme, such as JPEG, JPEG2000, and H.264 (Intra), which can be decoded conventionally at the decoder. The second subset of images is encoded using channel coding methods and requires a joint decoding process to reconstruct its image content. The joint decoding process is performed in two main steps. Firstly, the second subset of images is predicted from the conventionally decoded images of the first subset based on the inter-view correlation. Secondly, the error correction information associated to the second subset of images is applied to the predicted images to improve the visual quality of the predicted images.

One major challenge for multi-view imaging systems that employ distributed to coding techniques is the quality of the inter-view prediction. A multi-view imaging system often produces low-quality inter-view prediction when:

(i) the imaging devices (i.e., cameras) at different viewpoints are not carefully calibrated;

(ii) the images captured at different viewpoints have mixed resolutions;

(iii) the image planes of all imaging devices at different viewpoints are not arranged so that they are coplanar (e.g., as a camera array); and (iv) the optical axes of the imaging devices at different viewpoints are not perfectly parallel to each other.

SUMMARY

It is an object of the present invention to substantially overcome, or at least ameliorate, one or more deficiencies of know devices or systems.

According to one aspect of the present disclosure, there is provided a method of image coding for joint decoding of images from different viewpoints using distributed coding techniques, said method comprising the steps of:

receiving a first set of features and error correction bits corresponding to a first image obtained at a first viewpoint;

receiving a second set of features from a second image corresponding to a second viewpoint;

determining an approximation of said first image at said first viewpoint based on said first and second sets of features and said second image at said second viewpoint;

determining a reliability measure of said approximation of said first image by joint decoding the approximation using said error correction bits; and refining said approximation of said first image iteratively based on said reliability measure and image information derived from said joint decoding.

Preferably the determining step comprising the steps of:

estimating an affine transformation between said first and second sets of features;

adjusting at least one set of features based on said affine transformation;

generating a set of feature correspondences between said first and second sets of transformed features based on the positional difference between a first feature in said first set of transformed features and a second feature in said second set of transformed features;

refining said set of feature correspondences based on an approximation of epi-polar geometry and said first and second sets of transformed features.

Desirably, the refining step is performed iteratively. This may involve:

(a) using the set of feature correspondences to estimate the approximation of epi-polar geometry;

(b) determining a proximity measure between the first and second set of transformed features wherein the proximity measure is a weighted sum of a function of positional difference between a first feature in said first image and a second feature in said second image, and at least a function of a distance measured from said second feature to the corresponding epi-polar line defined by said first feature;

(c) determining the refined feature correspondence between each of a plurality of features in the first set of transformed features to a feature in the second set of transformed features based on the proximity measure; and (d) setting the refined feature correspondence as the set of feature to correspondences and repeating steps (a) to (c) based on the number of refined feature correspondences.

In one implementation, the weights used in the proximity measure are functions of the pixel coordinates of said first and second features. Alternatively, the positional difference and the distance measure are represented by Euclidean distance. Typically the first image is obtained from a DVC camera at a first resolution and the second image is obtained from a conventional camera at a second resolution, the second image being subject to intra-frame encoding. Generally, the first resolution is the same as, or lower than, the second resolution.

According to another aspect, there is provided an imaging system for forming an image of a scene, said system comprising:

at least one first camera for imaging the scene from a first viewpoint and for communicating first image data including at least a first set of feature points and error correction bits corresponding to a first image obtained at the first viewpoint to a decoder;

at least one second camera for imaging the scene from a second viewpoint and for communicating second image data of a second image obtained from the second viewpoint to the decoder, the first and second images at least partly overlapping;

the decoder being configured to received the first and second image data and comprising:
an extractor configured to extract a second set of feature points from the second image;
an estimator adapted to estimate at least one image region correspondence between the images from said first and second viewpoints based on said first set of to feature points and said second set of feature points;
a joint decoder for determining a decoded image and a reliability measure based on said at least one image region correspondence and said error correction bits; and
a reliability iterator for refining said image region correspondence iteratively based on said reliability measure and the decoded image.

Other aspects are also disclosed.

BRIEF DESCRIPTION OF THE DRAWINGS

At least one embodiment of the present invention will be described hereinafter with reference to the drawings, in which.

DETAILED DESCRIPTION INCLUDING BEST MODE

Figure 1:
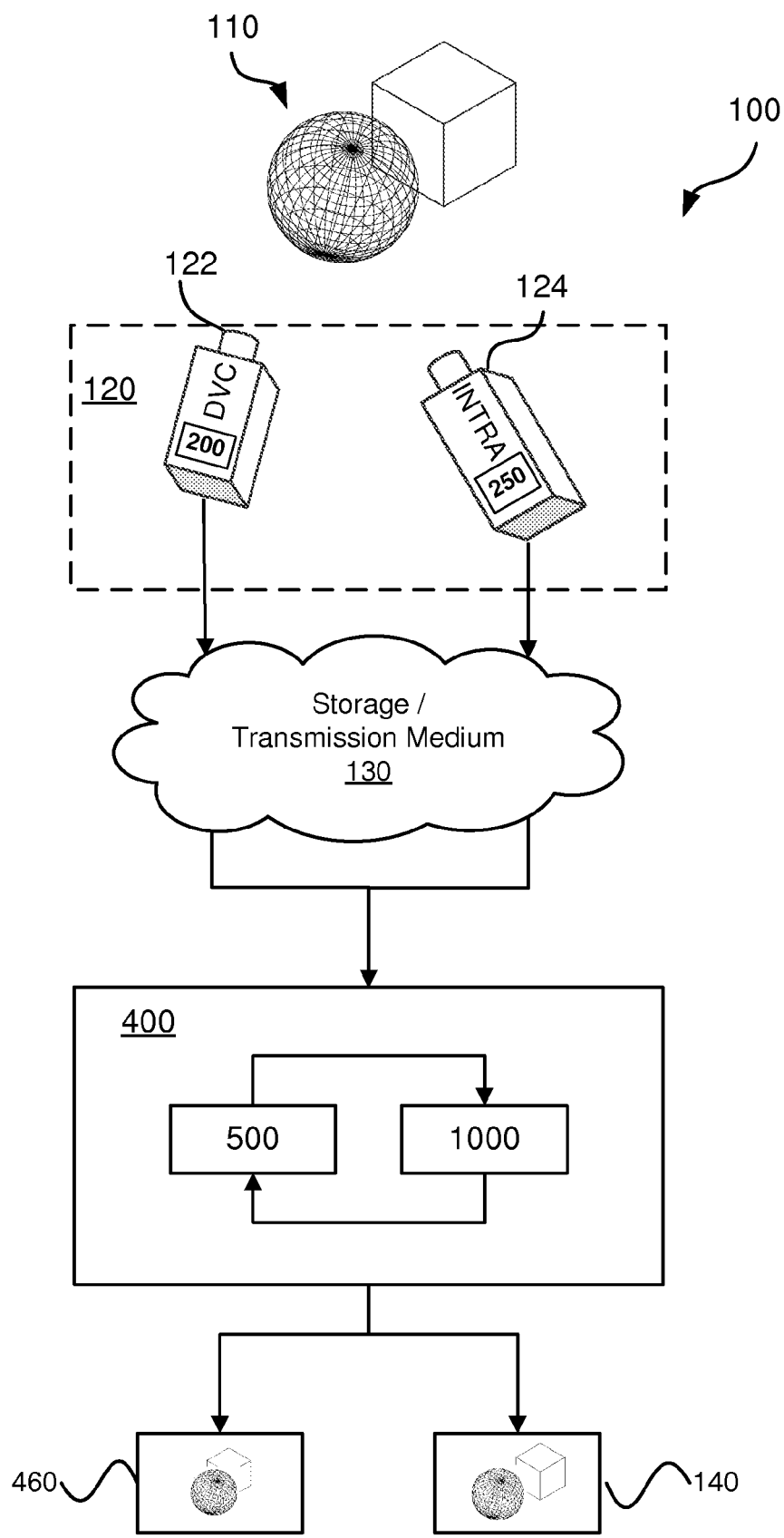
FIG. 1 is a block diagram of an exemplary configuration of a distributed multi-view coding system, with which the arrangements to be described may be practiced.

Methods, apparatus, and computer program products are disclosed for processing multi-view digital images each comprising a plurality of pixels. In the following description, numerous specific details, including image/video compression/encoding formats, and the like are set forth. However, from this disclosure, it will be apparent to those skilled in the art that modifications and/or substitutions may be made without departing from the scope and spirit of the invention. In other circumstances, specific details may be omitted so as not to obscure the invention.

Where reference is made in any one or more of the accompanying drawings to steps and/or features, which have the same reference numerals, those steps and/or features have for the purposes of this description the same function(s) or operation(s), unless the contrary intention appears.

Multi-View Coding System

Figure 2A:
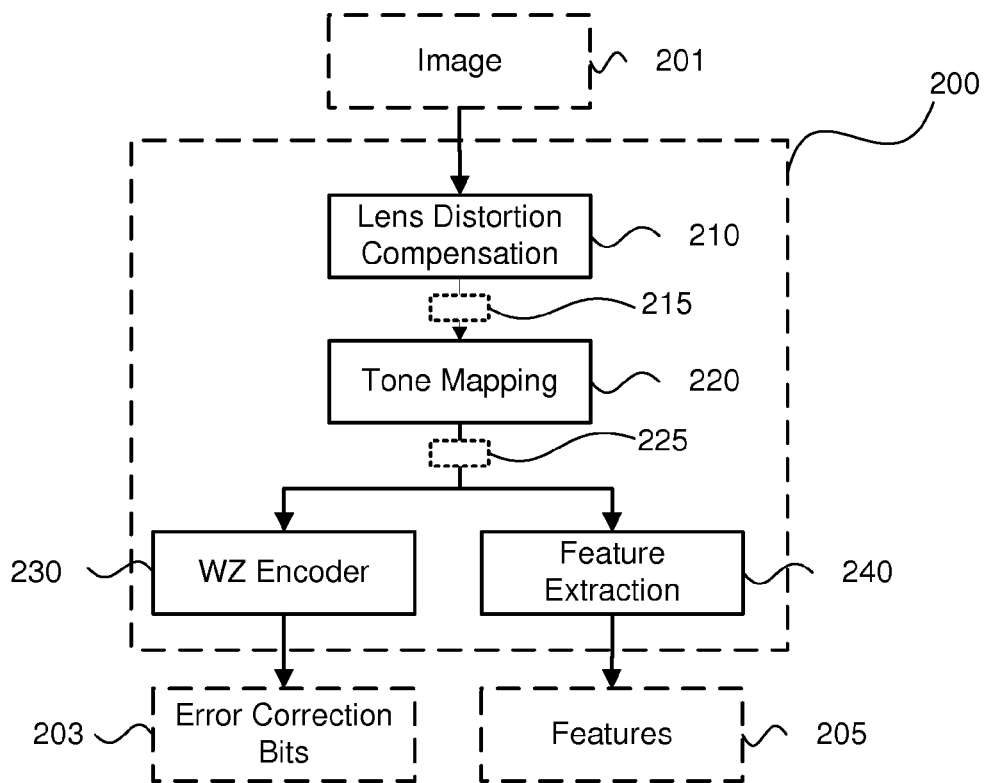
FIG. 2A is a schematic block diagram of a camera that employs Distributed Video Coding (DVC) schemes according to the present disclosure.
Figure 2B:
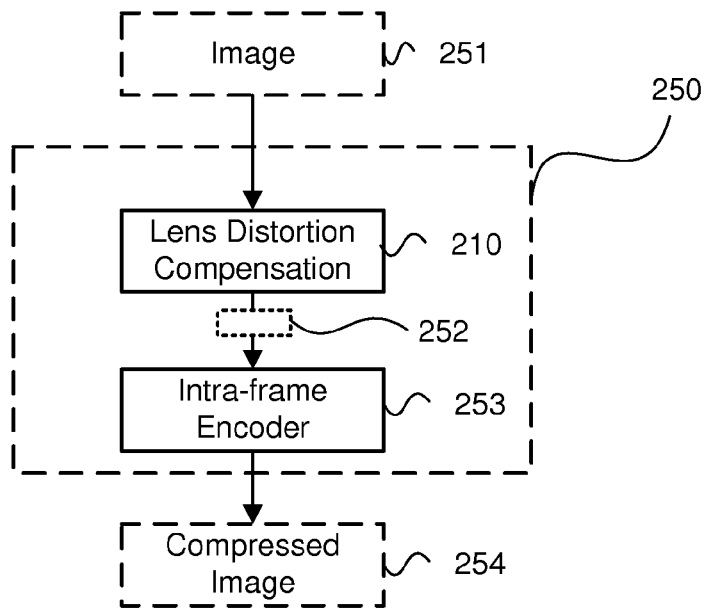
FIG. 2B is a schematic block diagram of a conventional camera.

FIG. 1 shows a configuration of a distributed multi-view coding system 100, comprising a set of independent encoders 120, and a joint decoder 400. The exact number of independent encoders in a distributed multi-view coding system may vary. Depending on the application, a distributed multi-view coding system may have two or more encoders. In addition, one or more independent encoders may be embedded into a camera, and therefore the number of cameras and encoders need not coincide. The to following description is written based on the scenario shown in FIG. 1, in which the encoder system 120 includes two independent cameras 122 and 124 which capture corresponding images of the same scene 110 and obtained from different viewpoints simultaneously. The scene 110 comprises a 3D spherical object and a 3D square object, for the purposes of illustration only. The camera 124 is a conventional camera which captures images from a (second) viewpoint. The camera 124 employs a conventional system 250 as depicted in FIG. 2B to generate raw image data or entropy encoded image data. The word "INTRA" appearing on the camera 124 of FIG. 1 stands for "Intra-frame" meaning that each image in an image sequence is encoded and decoded independently from other images in the sequence. The other camera 122 is a DVC camera which captures images from a different (first) viewpoint. The camera 122 employs a Wyner-Ziv (WZ) encoding system 200 as depicted in FIG. 2A to generate error correction bits using bitwise error correction methods.

The independent encoders, being the conventional camera 124 and the DVC camera 122 of FIG. 1, are generally not calibrated. As a consequence, each encoder may impart unique colour and structural distortions to the objects in the corresponding captured images, and these distortions are not known to the other encoders. In fact, for the scenario considered in this description, the two cameras 122 and 124 can be two physically and structurally largely different cameras operating and capturing the scene 110 at different image resolutions. In addition, the two cameras 122 and 124 need not be perfectly horizontally and/or vertically aligned to each other (e.g., being mounted rigidly on a support or a plane) and may have different viewing angles toward the 3D objects (e.g., the optical axes of the cameras do not align).

Data transmission is performed independently from the DVC camera 122 and the conventional camera 124 to a joint decoder 400 via a transmission medium or a storage device 130.

The joint decoder 400 performs joint decoding of images from different viewpoints using distributed coding techniques. The joint decoder 400 comprises a decoding loop between an inter-view image refinement system 1000 and a WZ decoder system 500. The joint decoder 400 firstly decodes the image data from the conventional camera 124, and uses this decoded image to predict the image captured by the DVC camera 122, based on an estimated epi-polar geometry. The inter-view prediction is corrected by error correction bits received from the DVC camera 122. Operation of the decoding loop is performed iteratively until the decoded image reaches a predetermined quality. Note that the joint decoder 400 may be implemented by software executing on a computer system or implemented in dedicated hardware.

Conventional Camera

As noted above, the conventional camera 124 captures images from the second viewpoint and may compress the captured images conventionally prior to data transmission. The camera 124 encodes the captured images using the system 250 of FIG. 2B, which may be implemented using the processor 905 of FIG. 9A. The system 250 processes a captured image 251 in two main steps: Firstly, the captured image 251 is read by a pre-processing step 210 to remove distortions due to lens imperfection. The output of this pre-processing step 210 is a modified image 252 which represents the image 251 if captured by an ideal camera (e.g., no lens distortion). Then, an intra-frame encoder 253 takes the modified image 252 and generates a compressed image 254.

There are two main sources of lens distortions in cameras, namely radial distortions and tangential distortions. Radial distortions arise as a result of the shape of the lens. Rays farther from the centre of the lens are bent more than those closer in, resulting in noticeable distortions at pixel positions near the image boundaries. Radial distortion can be modelled mathematically by:

$$x_{corrected} = x_{observed}(1 + k_1 r^2 + k_2 r^4 + k_3 r^6)$$

$$y_{corrected} = y_{observed}(1 + k_1 r^2 + k_2 r^4 + k_3 r^6) \quad (1)$$

where $(x_{observed}, y_{observed})$ are the coordinates of a point in the distorted image, $(x_{corrected}, y_{corrected})$ are the coordinates of the point if radial distortion is not present, r is the distance from the centre of the lens to the point $(x_{observed}, y_{observed})$, and $k_1$, $k_2$, and $k_3$ are the coefficients of the Taylor series expansion. Tangential distortions arise from the lens in the camera not being exactly parallel to the imaging plane, and are often modelled mathematically by two parameters, $p_1$ and $p_2$:

$$x_{corrected} = x_{observed} + [2p_1 y_{observed} + p_2(r^2 + 2x^2_{observed})]$$

$$y_{corrected} = y_{observed} + [p_1(r^2 + 2y^2_{observed}) + 2p_2 x_{observed}] \quad (2)$$

where $(x_{observed}, y_{observed})$ are the coordinates of a point in the distorted image, $(x_{corrected}, y_{corrected})$ are the coordinates of the point if tangential distortion is not present, and r is the distance from the centre of the lens to the point $(x_{observed}, y_{observed})$.

The lens distortion compensation module 210 uses the lens distortion parameters to generate the modified image 252 from the captured image 251 by solving the linear equations in Eqns. 1 and 2. In an exemplary implementation, the lens distortion parameters, $k_1$, $k_2$, $k_3$, $p_1$ and $p_2$, in Eq. (1-2) are estimated off-line using camera calibration methods.

The modified image 252 is subject to image compression in the intra-frame encoder 253. The compression method used by the intra-frame encoder 253 may be JPEG, JPEG-LS, JPEG2000, or H.264 (Intra). The output of the intra-frame encoder 253 is the compressed image 254.

DVC Cameras

The DVC camera 122 captures images from the first viewpoint and produces error correction bits. The error correction bits are later used by the joint decoder 400 to reconstruct the image captured by the DVC camera 122 with the help of the image captured by the conventional camera 124 at a different viewpoint. In an exemplary implementation, the encoding processing of the DVC camera 122 of FIG. 1 is implemented according to the system 200 of FIG. 2A, which comprises of a lens distortion compensation module 210, a tone mapping module 220, a WZ encoder 230, and a feature extraction module 240. The system 200 may be implemented by software executing on the processor 905 of FIG. 9A, or implemented in dedicated hardware.

In the system 200 of FIG. 2A, a captured image 201 is first processed by a lens distortion compensation module 210 to remove lens distortions from the captured image 201. This module is substantially identical to the module 210 in the system 250 of FIG. 2B. The output of the module 210 is a modified image 215 which represents the image 201 if captured by an ideal camera (e.g., no lens distortion).

The modified image 215 is then processed by a tone mapping module 220. The tone mapping module 220 modifies the colours (or intensity values) of the modified image 215 to match that of the conventional camera 124. In an exemplary implementation, a tone map used by the module 220 is generated offline using training test images. The tone map is generated by adapting a cumulative histogram of a test image from the DVC camera 122 to a corresponding cumulative histogram of the test image captured by the conventional camera 124. In an alternative implementation, a tone mapping algorithm as implemented by the module 220 may be based on contrast or gradient domain methods. In yet another alternative, which allows minimal communication between the cameras 122 and 124, the tone map of one camera can be made available to the other camera. The output of this module 220 is a tone-corrected image 225 in FIG. 2A.

The tone-corrected image 225 is further processed by two different modules in FIG. 2A: a Wyner-Ziv (WZ) encoder 230 which turns the tone-corrected image 225 into error correction bits 203, and a feature extraction module 240 which extracts a set of features 205 from the tone-corrected image 225.

In the exemplary implementation, the WZ encoder 230 operates directly on pixel values and can therefore be referred to as a pixel domain Wyner-Ziv encoder. Detail of the pixel domain Wyner-Ziv encoder will be described later with reference to FIG. 3. Alternatively, the WZ encoder 230 may be a transform-domain Wyner-Ziv encoder. This transform-domain encoder is substantially identical to the pixel-domain Wyner-Ziv encoder 300 of FIG. 3 (to be described) except that the transform-domain encoder has an additional pre-processing step (not illustrated in FIG. 3). This pre-processing step includes (i) transforming the pixel values of the input image 225 to transform coefficients and (ii) forming coefficient bands by concatenating coefficients of the same importance. The transformation is preferably a DCT-based transform. Alternative transforms, such as wavelet transforms and Fourier transform, can also be used.

The feature extraction module 240 extracts prominent features 205 from the tone-corrected image 225. These features may be in the form of corner points, line segments, edges, or other specific patterns. Each may be characterized by one or more of the to following properties such as position, width, height, size, orientation, contrast (e.g., gradient magnitude), and sharpness (e.g., rate of change of gradient direction).

In an exemplary implementation, feature coordinates and edges are extracted by the feature extraction module 240 from the tone-corrected image 225. A Harris corner detector and a Laplacian of Gaussian (LOG) filter are used to detect prominent corner features and edges in the image 225, respectively. Edges and the coordinates of these features are then transmitted to the decoder 400 to facilitate inter-view prediction at the decoder. Alternatively, other edge and corner detectors such as a Sobel edge detector, or feature detectors based on scale-invariant feature transform (SIFT), edge, shape, and curvature may be employed.

The error correction bits 203 from the WZ encoder 230 and the features 205 from the feature extraction module 240 form the outputs of the system 200 representing the camera 122 of FIG. 1. In the exemplary implementation, the outputs 203 and 205 are formed as bit streams and are transmitted directly to the decoder 400 via a transmission medium or a storage device, collectively enumerated in FIG. 1 as 130. In an alternative application, the bit streams 203 and 205 are transmitted separately through different transmission channels or storage devices 130.

Wyner-Ziv Encoder

Figure 3:
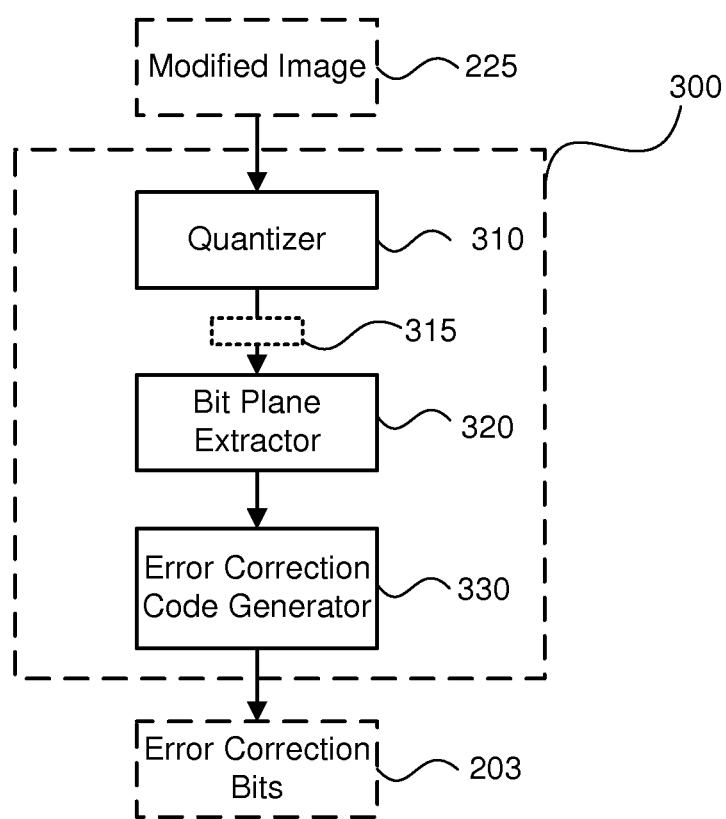
FIG. 3 is a schematic block diagram of a pixel-domain Wyner-Ziv encoder used in FIG. 2A.

The system 300 in FIG. 3 is the schematic block diagram of a pixel-domain Wyner-Ziv encoder which may be used as the encoder 230 by the DVC camera 122 of FIG. 1. The system 300 comprises of a quantizer module 310, a bit plane extractor module 320, and an error correction code generator module 330.

The image 225 is first processed by the quantizer module 310, which reduces the bit depth of the image 225 to generate a quantized image 315. Desirably, the quantizer module 310 is a uniform quantizer which can be implemented efficiently by performing bitwise right shift operations. The quantization step size is fixed to 16, allowing as many as 16 quantization bins for 8-bit greyscale images. Alternatively, the quantization step size is determined statistically from image data and is transmitted directly to the decoder 400. In a further implementation, the image 225 is divided into blocks. Each image block may be quantized with different quantization step size, and the step size may be re-computed at the decoder 400 to minimize the bit rate of the encoder 200 in FIG. 2A.

The quantized pixel values representing the image 315 are then extracted by a bit plane extractor module 320. The bit plane extractor module 320 performs the step of forming bit streams from the quantized pixel values in image 315 on a bit-plane-by-bit-plane basis. Preferably, scanning starts on the most significant bit plane of the image 315. The most significant bits of the image 315 are concatenated to form a bit stream containing only the most significant bits. In a second pass, the scanning concatenates the second most significant bits of all quantized pixels. This process repeats in this manner until the least significant bit plane is completed. This generates a single bit stream including each bit plane of the quantized image 315.

The bit plane extractor module 320 is followed by an error correction code generator 330 configured to generate error correction bits for each bit plane individually, starting with the most significant bit plane. These error correction bits from each bit plane are concatenated together to form an output bit stream 203 of error correction bits. Preferably, the error correction method used by the generator 330 is turbo codes. Alternative methods such as LDPC, Reed-Solomon codes, or a combination of the aforementioned error correction codes can be employed.

Distributed Multi-View Decoder

The operation of the joint decoder 400 in FIG. 1 is described in detail hereinafter with reference to FIG. 4. The joint decoder 400 comprises of an intra-frame decoder module 410, a feature extraction module 420, and an inter-view image alignment and prediction module 430, collectively performing the loop and functions of the inter-view image refinement system 1000 and WZ decoder system 500 described briefly above with reference to FIG. 1. The joint decoder 400 may be implemented using the processor 905 and memory 906 of FIG. 9.

The inputs of the decoder 400 include the features 205 representing a first set of features corresponding to the first viewpoint, the error correction bits 203 from the DVC camera 122 at the first viewpoint, and a compressed image 254 from the conventional camera 124 at the second viewpoint. The output of the decoder 400 is a reconstructed (decoded) image 470 representing the captured image 201 of the DVC camera 122 at the first viewpoint.

Figure 4:
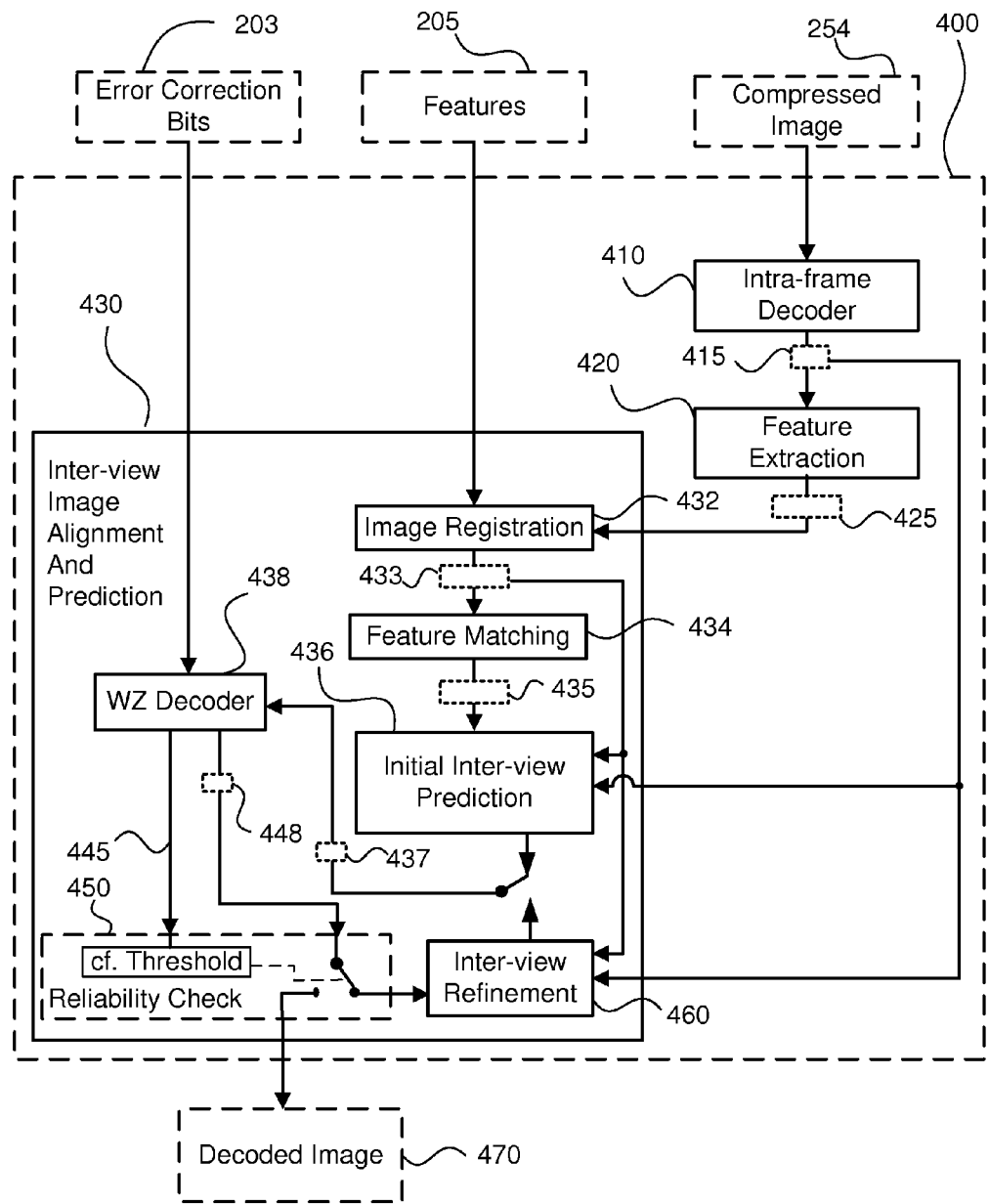
FIG. 4 is a schematic block diagram of a distributed multi-view decoder in FIG. 1.

In the decoder 400 of FIG. 4, the compressed image 254 is read by an intra-frame decoder 410. The intra-frame decoder 410 performs the inverse operation of the intra-frame encoder 253 of FIG. 2B to reconstruct the pixel values of the image captured at the second viewpoint by the conventional camera 124. The intra-frame decoder 410 outputs an image 415 which is equivalent to image 252 in FIG. 2B.

The intra-frame decoder 410 is followed by a feature extraction module 420. The feature extraction module 420 extracts a second set of features 425 from the image 415 generated by the intra-frame decoder 410. In an exemplary implementation, the operation of the feature extraction module 420 is substantially identical to the module 240 of system 200 in FIG. 2A. The output of the feature extraction module 420 are edges and the coordinates of the second set of features 425 which are extracted at the original resolution of the image 415. In an alternative implementation, the image 415 generated by the intra-frame decoder 410 may be scaled before optional smoothing using a Gaussian filter prior to performing feature extraction. In this case, the output 425 of the feature extraction module 420 are edges and the coordinates of the second set of features 425 which are extracted at different image resolutions of the image 415.

Inter-View Image Alignment and Prediction Module

Following the feature extraction module 420 is the inter-view image alignment and prediction module 430. The inter-view image alignment and prediction module 430 comprises an image registration module 432, a feature matching module 434, an initial inter-view prediction module 436, a WZ decoder module 438, a reliability check module 450, and an inter-view refinement module 460.

The operations of inter-view image alignment and prediction module 430 starts with the image registration module 432. The image registration module 432 first computes the relative rotation, scale, and translation between the images 201 and 251 and also transforms the coordinates of the extracted features (205 and 425) to the same coordinate system. Following the image registration module 432 is the feature matching module 434 where an initial feature correspondence between the two transformed feature sets represented by 433 are determined and output as 435. These feature correspondences 435 are then input to the initial inter-view prediction module 436 to estimate the epi-polar geometry of the scene and consequently to generate an initial inter-view prediction 437. This image forms the first version of side information 437, as known to people skilled in the art, for the WZ decoder module 438.

The inter-view image alignment and prediction module 430 then performs the loop and functions of the inter-view image refinement system 1000 and WZ decoder system 500 as outline in FIG. 1. The loop starts with the WZ decoder module 438. The WZ decoder module 438 corrects prediction errors in the side information 437 incrementally using the input error correction bits 203. The WZ decoder module 438 outputs a partially decoded image 448 and its reliability 445 to the reliability check module 450. The reliability check module 450 compares the reliability of the decoded image 448 against a predetermined threshold. If the reliability is below the predetermined threshold, the decoded image 448 is considered to be unreliable. Therefore, the inter-view predicted image 437 is subject to further refinement by the inter-view refinement module 460 with the help of the decoded image 448, and the refined inter-view-prediction 437 is fed back to the WZ decoder 438 for another iteration of WZ decoding. This decoding loop repeats until the reliability of the decoded image 448 is equal to or larger than the predetermined threshold, or a maximum number of decoding iterations is reached.

The output of the inter-view image alignment and prediction module 430 is the decoded image 470 that synthesizes the image captured by the DVC camera 122 at the first view point. Each component of the inter-view image alignment and prediction module 430 is described in detail hereinafter with reference to FIGS. 5, 6, 7, 8, and 10.

Image Registration Module

Figure 6:
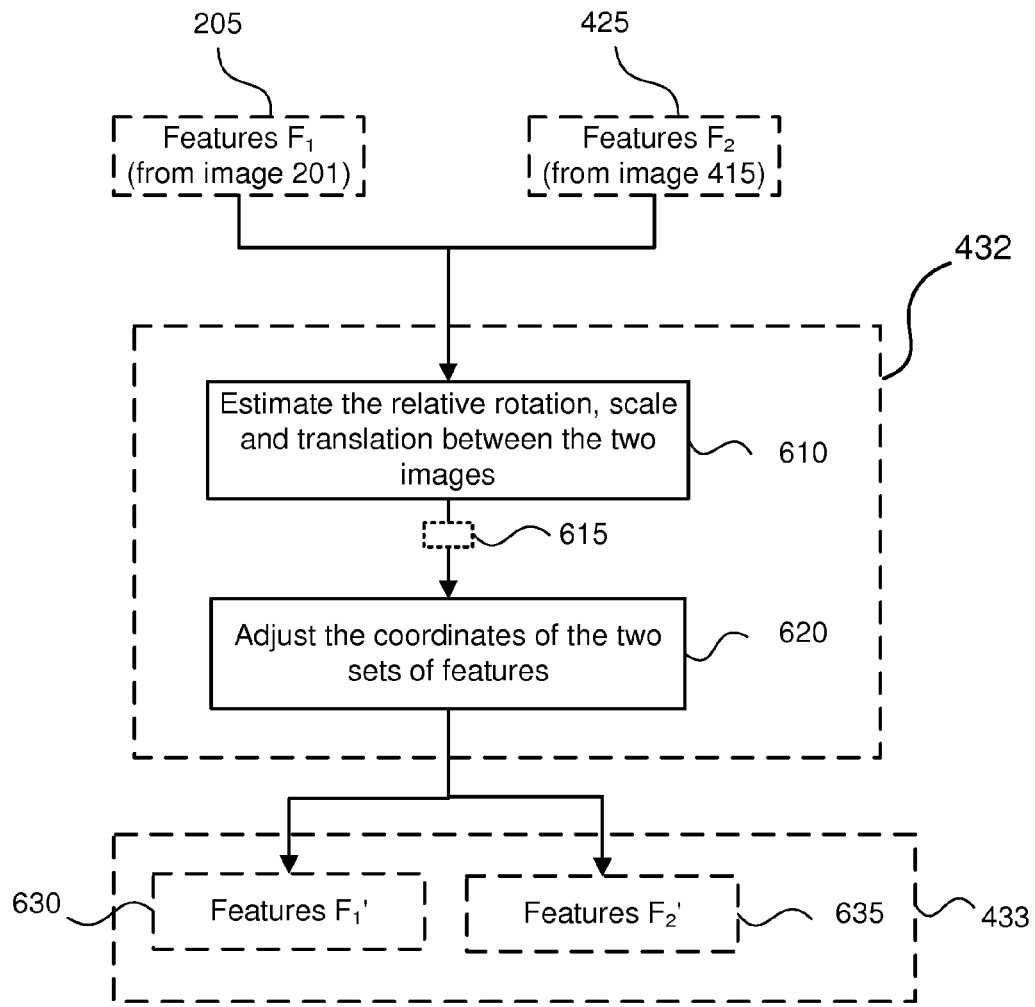
FIG. 6 is the schematic block diagram of the image registration module in FIG. 4.

FIG. 6 is the schematic diagram of the image registration module 432 described with reference to FIG. 4. The image registration module 432 takes two inputs: the features 205 from system 200 and the features 425 extracted from the image 415. The affine transformation between the two sets of input features is first estimated in a step 610. The output of the step 610 is the affine transform 615 which incorporates the relative rotation, scale, and translation between the features 205 and 425. Then in the step 620, the coordinates of at least one set of the features (205 or 425) is adjusted according to the affine transform 615. As a result, the transformed features, derived from images 201 and 415, share the same coordinate system. The output of the image registration module 432 is the transformed features 630 and 635, which correspond to features 205 and 425 respectively, collectively forming the output 435.

In an exemplary implementation, the affine transformation is computed using the edge information extracted from images 201 and 415, instead. The edge information may be represented by an n-bit or binary edge map, one for each image 201 and 415.

Feature Matching Module

Figure 7:
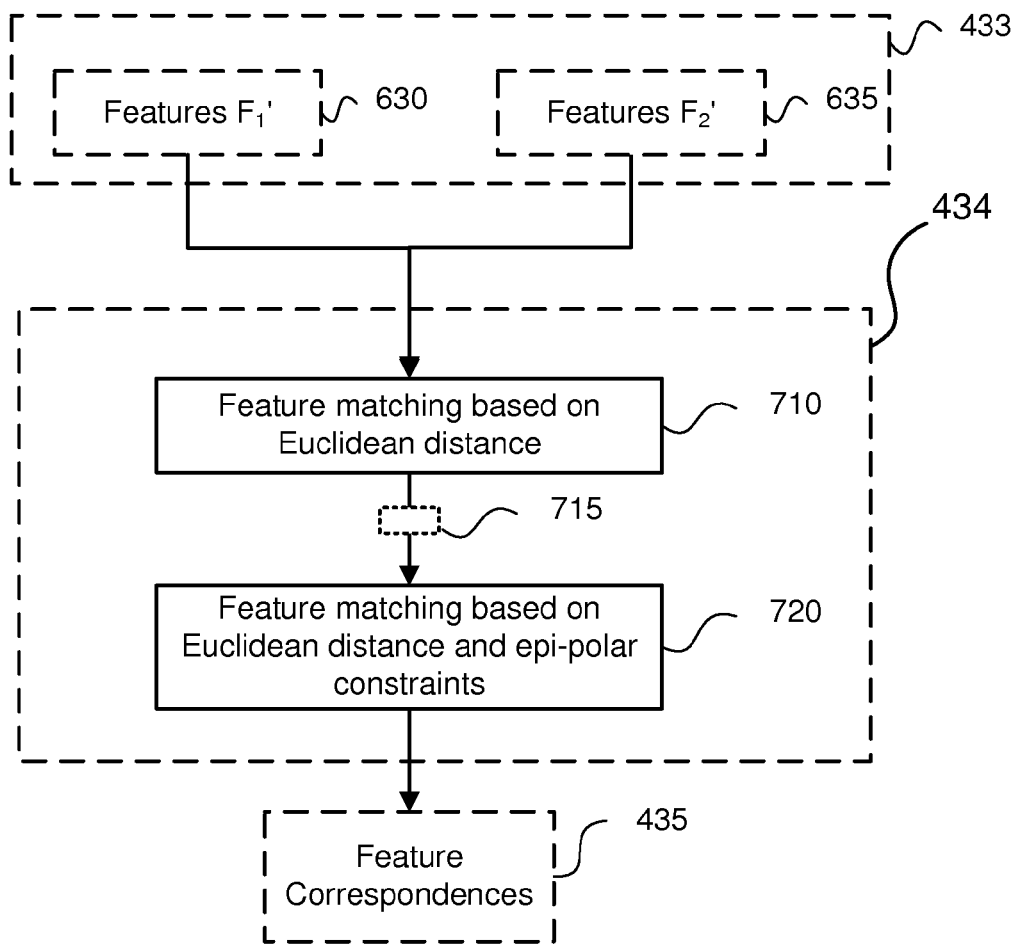
FIG. 7 is the schematic block diagram of the feature matching module in FIG. 4.

FIG. 7 is the schematic diagram of the feature matching module 434 briefly described in FIG. 4. The feature matching module 434 takes the transformed features 630 and 635 from the image alignment module 432 as input. The operation of the feature matching module 434 includes two main steps: an initial feature matching step 710, and a feature matching refinement step 720.

The initial feature matching step 710 determines initial feature correspondences 715 between the features 630 and 635 using a proximity measure based on Euclidean distance only. The operations of the step 710 comprise:

(1) Computing a proximity measure for each potential correspondence between the two sets of features 630 and 635 based on their positional difference using, for example, a Gaussian-weighted Euclidean distance function $$G_{ij} = e^{-r_{ij}^2/2\sigma^2} \quad (3)$$

where $G_{ij}$ represents the Gaussian (weighted sum) distance between two features $F'_{1i}$ and $F'_{2j}$; $r_{ij} = \|F'_{1i} - F'_{2j}\|$ is the Euclidean distance between the two features; and σ is a Gaussian parameter which controls the separation between the two features: small σ tolerates small displacements between the potential feature correspondences, while large σ permits large viewpoint difference between images. In a preferred implementation the value of σ is 0.125 of the image width in pixels.

(2) And for each feature in the first set, finding its best correspondence based on the proximity measure between the two feature sets. In an exemplary implementation, the best correspondence is found using the Scott and Longuet-Higgins algorithm. The algorithm performs Singular Value Decomposition (SVD) to the proximity matrix G derived from the two sets of features 630 and 635. The eigenvalues generated by the SVD are normalized and an inverse SVD is used to generate a normalized proximity matrix. The feature pair which gives the maximum value in both the row and the column of the normalized proximity matrix is selected as a feature correspondence.

In the next step 720, the feature correspondences between the two input features 630 and 635 are refined by taking into account the epi-polar geometry of the two viewpoints which is derived from the initial feature correspondences 715.

The epi-polar geometry between two views of a scene is often represented by a 3×3 matrix, known as a fundamental matrix (or essential matrix). The fundamental matrix relates a point in one view (image) to a line, namely an epi-polar line in a second view (image). Only points along this line in the second view can be the potential candidates to match the point in the first view. This additional constraint enables a better and more reliable feature matching between the two sets of features 630 and 635.

In the exemplary implementation, the feature matching refinement step 720 operates substantially identically to the initial feature matching step 710, except that the proximity matrix G now is re-defined to take into account of the epi-polar constraint. The re-defined proximity measure $G_{ij}$ is given as follows:

$$G_{ij} = e^{-\lambda_{1ij} r_{ij}^2 / 2\sigma_1^2} \otimes e^{-\lambda_{2ij} d_{ij}^2 / 2\sigma_2^2} \quad (4)$$

where $G_{ij}$ is the Gaussian weighted distance between two features $F'_{1i}$ and $F'_{2j}$; $r_{ij} = \|F'_{1i} - F'_{2j}\|$ is the Euclidean distance between the two features; $d_{ij}$ is the minimum distance from $F'_{2j}$ to the epi-polar line defined by $F'_{1i}$; $\lambda_{1ij}, \lambda_{2ij}$ determine the influence of Euclidean distance and epi-polar constraint at each pixel location, respectively; and $\sigma_1, \sigma_2$ are the Gaussian parameters defined for each term and depend on the size of the image 425 (output from the intra-frame decoder 410).

It is worth noting that features in images are generally concentrated near the centre of the images, hence epi-polar constraints tend to be more reliable near the image centre and less reliable as features come close to the image boundary. Therefore, in the exemplary implementation, $\lambda_{1ij}$ is a constant (i.e., $\lambda_{1ij}=1$) and $\lambda_{2ij}$ is 0 for features $F'_{1i}, F'_{2j}$ near the image boundary and is 1 everywhere else. Alternatively the value of $\lambda_{2ij}$ may be varied as a function of a distance to the image boundary. Also note that the feature refinement step 720 may be iterated or executed more than once and repeated until no new feature correspondences are found or the number of iterations exceeds a predetermined threshold.

The output of the feature matching module 434 is the feature correspondence 435, representing a one-to-one mapping between each of the features 205 from image 201 and the corresponding feature from features 425. This concludes the description of the operation of the feature matching module 434 in FIG. 7.

Initial Inter-View Prediction Module

Figure 8:
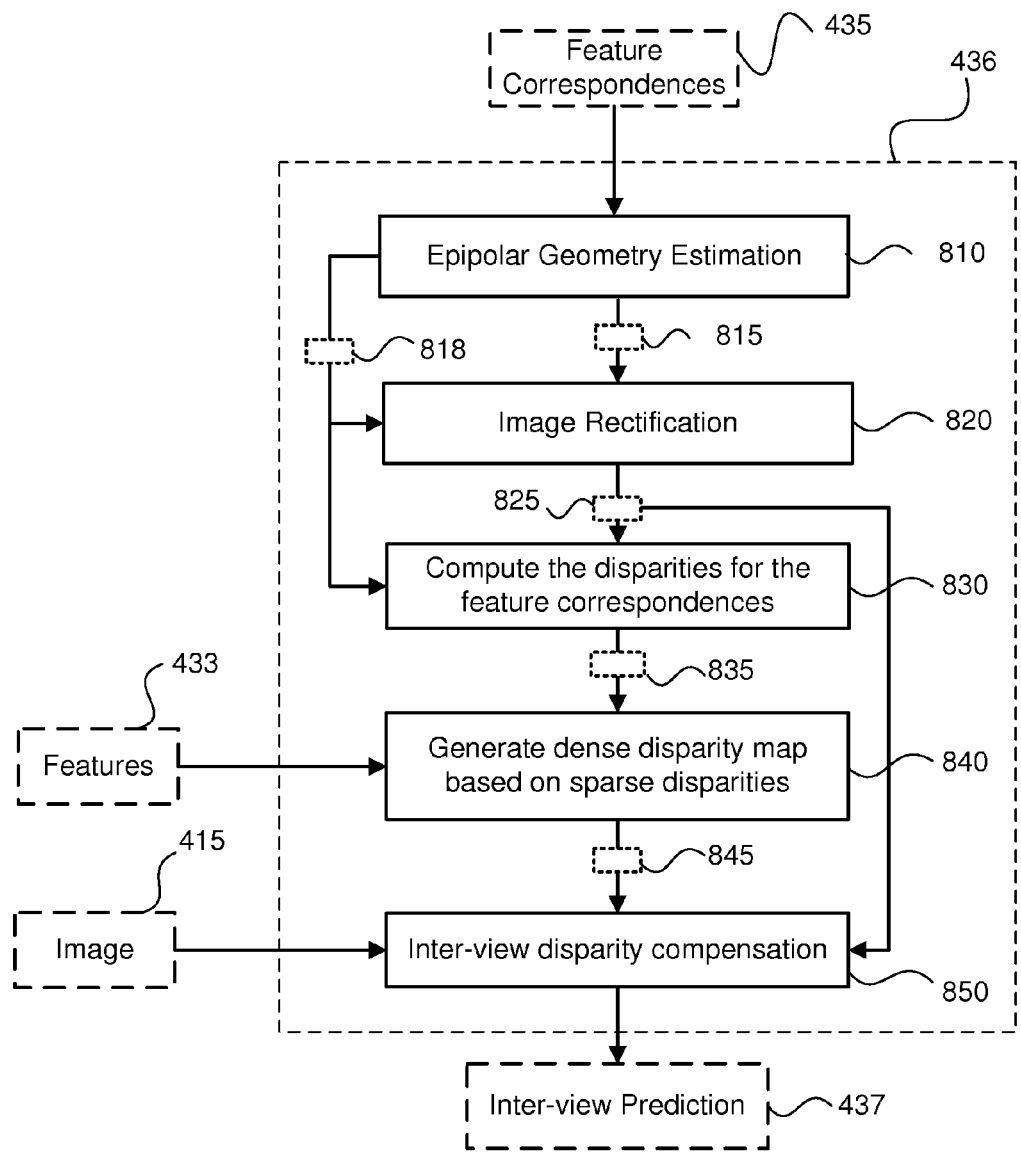
FIG. 8 is the schematic block diagram of the initial inter-view prediction module in FIG. 4.

FIG. 8 is the schematic diagram of the initial inter-view prediction module 436 briefly described in FIG. 4. The initial inter-view prediction module 436 takes three inputs: the feature correspondences 435 output from the feature matching module 434, the transformed features 433 output from the image registration module 432, and the decoded image 415 output from the intra-frame decoder 410.

The initial inter-view prediction module 436 starts with an epi-polar geometry estimation step 810, where the fundamental matrix representing the epi-polar geometry between the two views (images 201 and 415) is computed. The computation of the fundamental matrix follows an iterative minimization process consisting of:

(1) estimating the fundamental matrix 815 based on feature correspondences 435;

(2) projecting each feature in the feature correspondence 435 extracted from image 201 to the corresponding epi-polar line in image 415;

(3) computing the average of the distance from each corresponding feature extracted from image 415 to their corresponding epi-polar lines; and (4) minimizing the average distance produced by step (3) by adjusting the fundamental matrix 815 and the process is returned to step (1).

Such an iterative miminization operation can be implemented, for example, using Zhang's Least-Median-of-Square (LMedS) method, which is robust for rejecting false feature correspondences. Alternatively, other robust estimation methods, such as RANdom SAmple Consensus (RANSAC), can be employed.

The outputs of the epi-polar geometry estimation module 810 is the fundamental matrix 815 representing the epi-polar geometry between the images 201 and 415, and a set of refined feature correspondences 818 which match the estimated epi-polar geometry.

The processing then proceeds to an image rectification module 820. The image rectification module 820 takes the estimated fundamental matrix 815 and the refined feature correspondences 818 as its inputs to generate two 2D rectification maps 825, one for each of the images (201 and 415). The rectification maps 825 are used to transform pixels in images 201 and 415 to the rectified image coordinates. In this rectified image coordinates, the epi-polar lines derived from a pair of corresponding features are horizontally aligned (i.e., the corresponding features in the rectified images now have the same y-coordinates and differ only in the x-coordinates).

In a particular implementation, the image rectification module 820 implements Hartley's stereo rectification method for rectifying un-calibrated cameras. Alternatively, if the DVC camera 122 and the conventional camera 124 of FIG. 1 can be jointly calibrated (e.g., using pre-defined calibration patterns), Bouguet's stereo rectification method can be employed.

Following the image rectification module 820 is a sparse disparity estimation step 830. In the sparse disparity estimation step 830, the coordinates of each feature correspondence 818 are mapped to the rectified coordinates according to the two rectification maps 825 output from the step 820. As a result, each feature correspondence now has the same y-coordinate and differs only in the x-coordinates. The horizontal difference of each feature correspondence represents the so-called disparity of that feature pair. The output of the sparse disparity estimation step 830 is to disparity values 835 representing the view-point difference for each of the refined feature correspondences.

Following the sparse disparity estimation step 830 is a dense disparity generation step 840. The dense disparity generation step 840 takes the disparities 835 output from the sparse disparity estimation step 830 and the transformed features 433 as inputs. The output of dense disparity generation step 840 is a dense disparity map 845 containing pixel-by-pixel disparity values between the images 201 and 415.

In the exemplary implementation, the distribution (i.e., the range of the disparity) is calculated based on the disparities 835 output from the step 830. Then given the disparity distribution, a general stereo matching algorithm, such as Graph-cut, is used to generate the pixel-by-pixel disparity between the image 201 and 415, based on the transformed features 433 (i.e., edges) extracted from images 201 and 415. Finally, a post-processing is applied to the dense disparity map to fix false disparity values. Techniques such as median filters, nearest-neighbour interpolation, and water-fill methods may be used in a post-processing step to fill regions that do not associate with disparity values.

The final step of the initial inter-view prediction module 436 is an inter-view disparity compensation step 850. The initial inter-view prediction module copies the pixel values of the input image 415 (in the rectified image coordinates) to the corresponding positions of the rectified image in the viewpoint of the DVC camera 122 based on the computed dense disparity map 845. This generates an intermediate inter-view prediction in the rectified image coordinates. This intermediate inter-view prediction is then un-rectified by applying the inverse of the rectification map 825 output to from the image rectification step 820. This forms the final output of the initial inter-view prediction module 436, which is represented by the inter-view prediction 437 in both FIGS. 4 and 8. This concludes the description of the initial inter-view prediction module 436.

Wyner-Ziv Decoder

Figure 5:
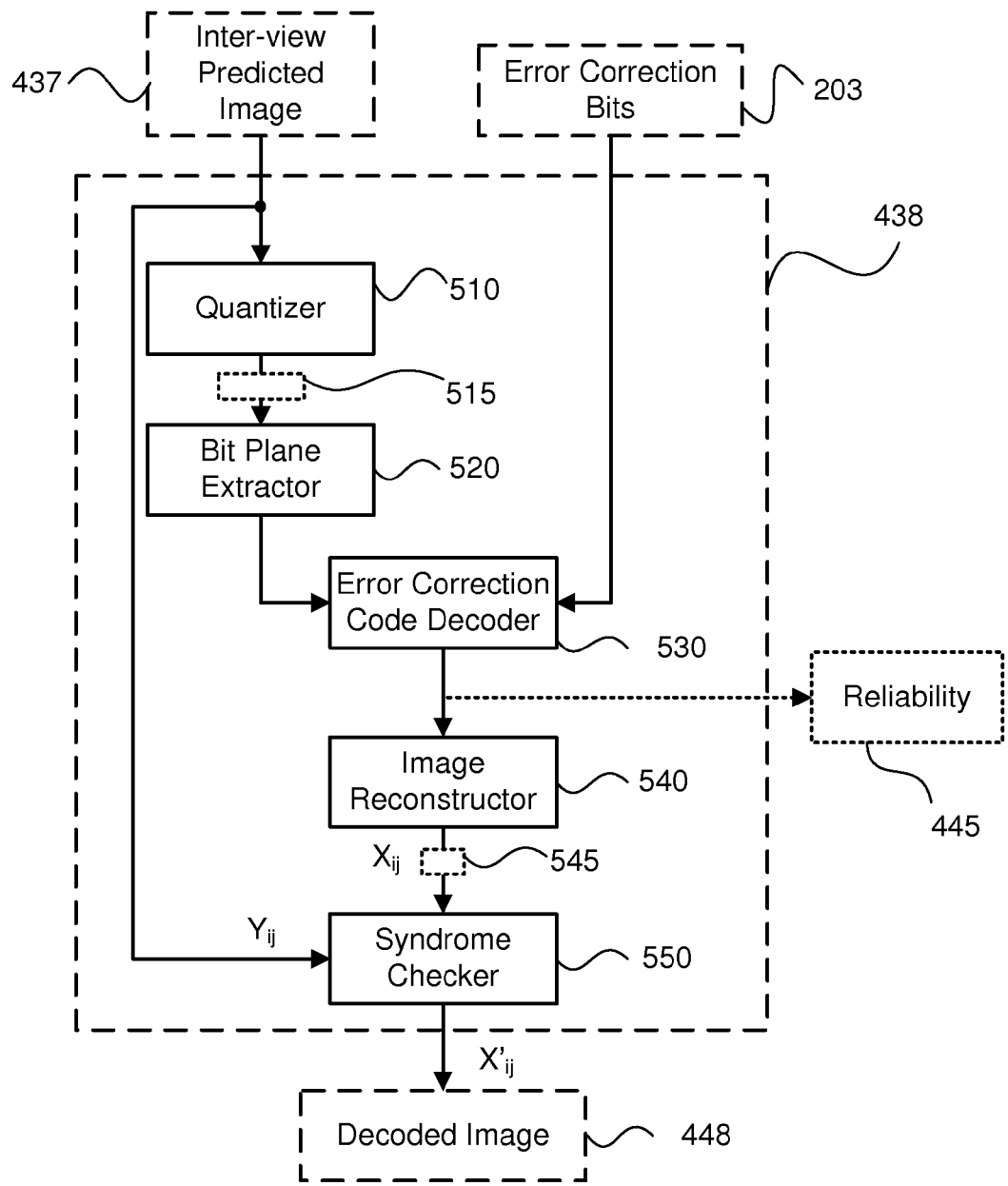
FIG. 5 is a schematic block diagram of a pixel-domain Wyner-Ziv decoder in FIG. 4.

The Wyner-Ziv decoder 438 briefly described in FIG. 4 is now described in detail hereinafter with reference to FIG. 5. The WZ decoder 438 includes a quantizer module 510, a bit plane extractor module 520, an error correction code decoder module 530, an image reconstructor module 540, and a syndrome checker module 550. The WZ decoder 450 takes two inputs. The first input is the inter-view prediction 437 (i.e., the predicted view of the DVC camera 122), which is used as the side information for Wyner-Ziv decoding. The second input of the WZ decoder 438 is the error correction bits 203 sent from the system 200 of FIG. 2A.

In the first step, the quantizer module 510 reduces the bit depth of the inter-view prediction 437 to generate the quantized image 515. Preferably, the quantizer module 510 is a uniform quantizer and is substantially identical to the module 310 in FIG. 3. The quantized pixel values are then extracted from the image 515 by the bit plane extractor module 520.

In the second step, the bit plane extractor module 520 performs the step of forming bit streams from the quantized pixel values in the image 515 on a bit-plane-by-bit-plane basis. Preferably, the bit plane extractor module 520 is substantially identical to the module 320 in FIG. 3. The extraction processing begins from the most significant bit plane to the least significant bit plane and generates one bit stream for each bit plane of the image 515.

In the next step, the error correction code decoder module 530 performs the operation of bitwise error correction to correct prediction errors in the output of the bit plane extractor module 520. This operation is performed on a bit-plane-by-bit-plane basis, starting with the most significant bit plane. Preferably, a turbo decoder is employed as the decoder 530. The turbo decoder performs iterative decoding on each bit plane separately using belief propagation techniques such as Soft-Output Viterbi Algorithm (SOVA), Maximum A-Posteriori Algorithm (MAP), and a variant of MAP. Each decoded bit (decoded bit sequence if SOYA is employed) is associated to the reliability measure 445, which indicates the confidence of the decoded bit (or decoded bit sequence in the case of SOVA). In addition to the decoded bit sequence, the turbo decoder also provides information about the likely values of the decoded bits. This information is typically expressed in terms of the Log Likelihood Ratios. The Log Likelihood Ratios are typically determined during the operation of the turbo decoder and are defined as follows:

$$L(u_k) = \ln\left(\frac{P(u_k = +1)}{P(u_k = -1)}\right)$$

where $P(u_k=+1)$ denotes the probability that the bit $u_k$ equals +1 and where $P(u_k=-1)$ denotes the probability that the bit $u_k$ equals −1. The sign of the $L(u_k)$ denotes the decoded bit value, and $|L(u_k)|$ indicates the confidence of the decoded bit and is referred to as the reliability measure 445. The reliability measure 445 is later used by the reliability check module 450 to determine the overall image quality of the decoded image.

In an alternative implementation, the error correction code decoder 530 may employ LDPC, Reed-Solomon codes, or a combination of these error correction codes.

The next step in the decoding process is the image reconstructor module 540. The image reconstructor module 540 takes the decoded bit planes from the error correction code decoder module 530. The decoded bits corresponding to the same spatial location are concatenated together to reconstruct a quantized version of the image captured by the DVC camera 122, being a quantized image 545. Each element of the quantized image 545 is a coset index and is used to correct the approximation errors in the inter-view predicted image 437.

The syndrome checker module 550 then compares the pixel values of the inter-view predicted image 437 against the coset indexes 545 from the image reconstructor module 540 to generate the decoded image 448. The syndrome checker module 550 operates on a pixel-by-pixel basis. For a given pixel location (i, j) in the predicted image 437, if the pixel value $Y_{ij}$ is within the quantized bin (interval) $X_{ij}$ from the quantized image 545, then the final pixel value $Y'_{ij}$ of the decoded image 448 takes the value of $Y_{ij}$. If $Y_{ij}$ lies outside the quantized bin (interval) $X_{ij}$, then the syndrome checker module 550 clips the reconstruction towards the boundary of the quantized bin (interval) $X_{ij}$ closest to $Y_{ij}$. This process repeats until all pixels in the decoded image 448 are determined by the module 550. The decoded image 448 represents the final approximation decoded image 470 of the image captured by the DVC camera 122, subject to passing the reliability check 450 of FIG. 4.

Reliability Check Module

In order to enable iterative operations between the system 500 and the system 1000 in FIG. 1, a reliability check module 450 is incorporated in the inter-view image alignment and prediction module 430 of FIG. 4. The reliability check module 450 takes the decoded image 448 output from the WZ decoder 438 and its reliability measure 445 as inputs. The module 450 operates essentially as a controlled switch determining whether the decoded image 448 becomes the output image 470 or is input to the inter-view refinement module 460 for further refinement.

In the exemplary implementation, the reliability check module 450 compares the reliability measure 445 output from the Wyner-Ziv decoder 438 to a predetermined threshold. If the reliability exceeds the threshold, then the decoded image 445 is considered to be reliable and is output as the final decoded image 470. On the other hand, if the reliability is below the threshold, the decoded image 448 is subject to further refinement by processing within a loop between the Wyner-Ziv decoder 438 and the inter-view refinement module 460. The threshold used in the reliability check is predetermined and desirably determined offline based on a set of test images.

Inter-View Refinement Module

Figure 10:
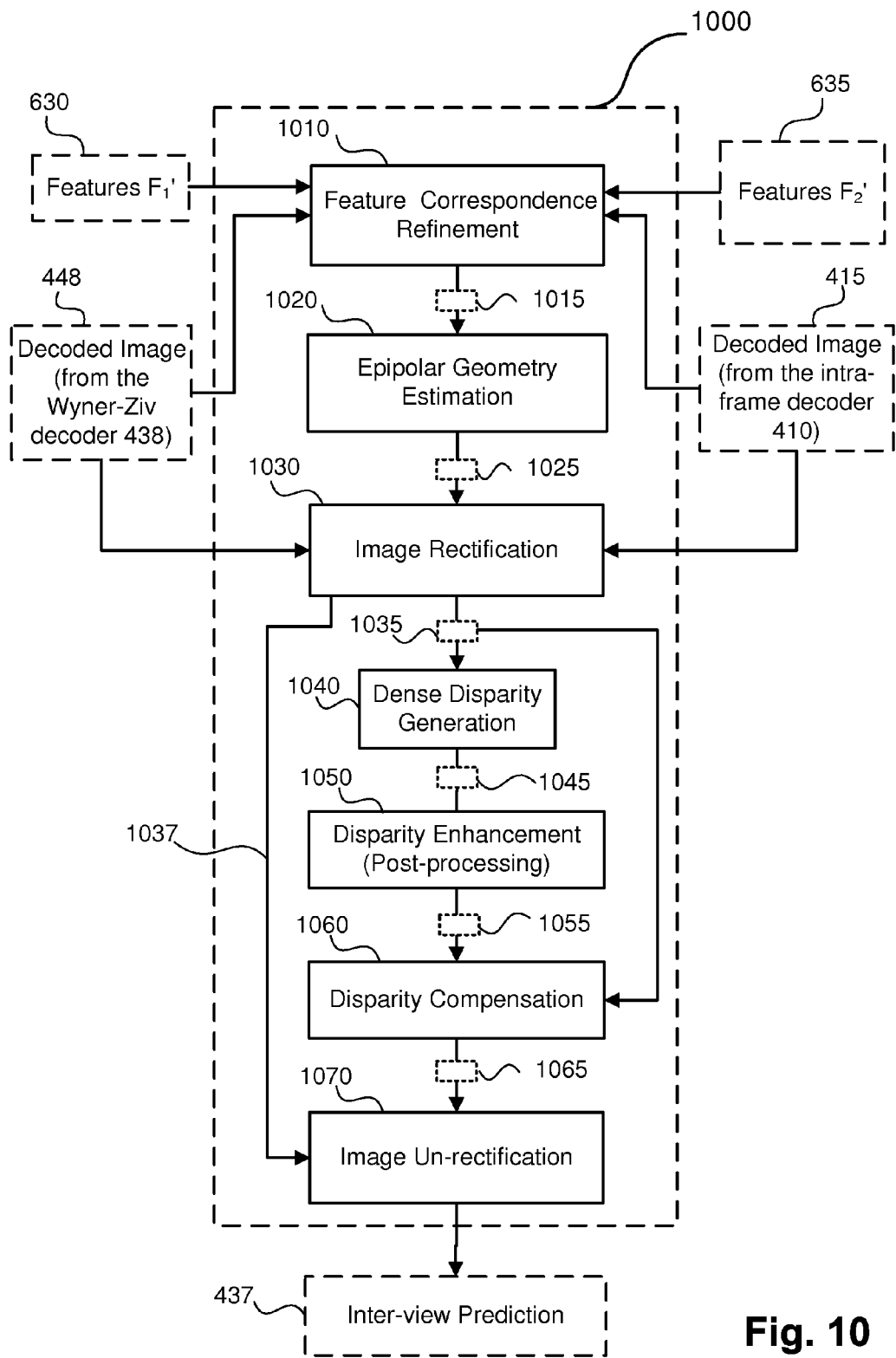
FIG. 10 is the schematic block diagram of the inter-view refinement module in FIG. 4.

The inter-view refinement module 460 briefly mentioned in FIG. 4 is now described in detail with reference to the system 1000 of FIG. 10. The inter-view refinement module 460 (or equivalently the system 1000) takes four inputs: the features 630 and 635 which are output from the image registration module 432 of FIG. 4, the decoded image 448 from the Wyner-Ziv decoder 438, and the decoded image 415 from the intra-frame decoder 410. The inter-view refinement module 460 uses the additional image information derived from the WZ-decoded image 448 to improve the estimation of the epi-polar geometry and the disparity values between the two views. The output of the inter-view refinement module 460 is a refined inter-view prediction 437 representing a better approximation of the image captured by the DVC camera 122 based on inter-view correlation.

The operation of the system 1000 starts with a feature correspondence refinement step 1010. The step 1010 computes a more reliable set of feature correspondences between the feature 630 and 635 by taking both the Euclidean distance and the intensity similarity of two features into account. The operational process of the step 1010 is substantially identical to that the step 710 in FIG. 7, except that now the proximity measure for each potential correspondence between the two sets of features 630 and 635 is given as a combination of two Gaussian-weighted function as follows:

$$G_{ij}^R = e^{-r_{ij}^2/2\sigma^2} \cdot e^{-c_{ij}^2/2\eta^2} \quad (5)$$

where $G_{ij}^R$ represents the new proximity measure between two features $F'_{1i}$ and $F'_{2j}$; $r_{ij}=\|F'_{1i}-F'_{2j}\|$ is the Euclidean distance between the two features; $\sigma$ is the parameter which controls the separation between the two features. Its value is identical to that of Eq. (3); $c_{ij}$ represents the normalized cross correlation between the two image regions $R_{1i}$ and $R_{2j}$, where $R_{1i}$ is an image region of image 448 which is centred at the feature $F'_{1i}$, and $R_{2j}$ is an image region of image 415 which is centred at the feature $F'_{2j}$; $\eta$ is a parameter controlling the impact of the cross correlation to the entire proximity measure and can be set to 0.40. In the exemplary implementation, a square region of size 15×15 is used for the calculation of the normalized cross correlation $c_{ij}$.

The output of feature correspondence refinement step 1010 is a refined set of feature correspondence 1015, which delivers a better matching accuracy between the features 630 and 635 than the initial feature correspondence 435 generated by the feature matching module 434 of FIG. 4.

Following the feature correspondence refinement step 1010 is an epi-polar geometry estimation step 1020. The epi-polar geometry estimation step 1020 estimates the underlying epi-polar geometry from the refined feature correspondence 1015. The operation of the epi-polar geometry estimation step 1020 may be identical to that of the epi-polar geometry estimation step 810 in the initial inter-view prediction module 436 (FIG. 7). The output of the epi-polar geometry estimation step 1020 is a refined fundamental matrix and a set of refined feature correspondences, collectively represented as 1025 in the figure.

The processing then proceeds to an image rectification step 1030. The image rectification step 1030 takes the refined fundamental matrix and feature correspondences 1025 as its inputs to compute two 2D rectification maps 1037, one for each of the images (201 and 415). The processing of rectification map generation is substantially identical to that of image rectification module 820 in the initial inter-view prediction module 436 (FIG. 7). Nevertheless, the image rectification step 1030 also applies the rectification maps 1037 to the images 448 and 415 and produces a rectified image pair 1035.

Following the image rectification step 1030 is a dense disparity generation step 1040. The dense disparity generation step 1040 takes the rectified image pair 1035 as its input to generate refined dense disparity maps 1045 representing an improved version of the initial dense disparity maps 845 generated by the dense disparity generation module 840 of the initial inter-view prediction module 436 (FIG. 7). The operation of the dense disparity generation step 1040 is substantially identical to that of the dense disparity generation module 840 of FIG. 7, expect that the dense disparity generation step 1040 is based on the pixel intensity value of the rectified image pair 1035, not the features (i.e., edges) derived from the images 201 and 415 as in step 840.

The dense disparity maps 1045 produced by the dense disparity generation step 1040 is subject to further enhancement at a disparity enhancement step 1050. The disparity enhancement step 1050 performs a post-processing step to correct unreliable disparity values in the dense disparity map 1045. The unreliable disparity values are detected by checking the consistency of the disparity maps 1045 between the two views, a technique known as cross-checking. After detecting unreliable disparity values, techniques such as median filters, nearest-neighbour interpolation, water-filling, and surface fitting may be used to fill regions that are associate with unreliable disparity values. The output of the disparity enhancement step 1045 is enhanced dense disparity maps 1055.

Following the disparity enhancement step 1050 is a disparity compensation step 1060. The disparity compensation step 1060 generates the predicted image 437 by copying pixel values from the rectified image corresponding to image 415 contained in the image pair 1035 based on the enhanced dense disparity maps 1055 output from the disparity enhancement step 1050. The output of the disparity compensation step 1060 is an intermediate inter-view prediction 1065 representing the prediction of the image 448 from the image 415 in the rectified image coordinates.

The final step of the system 1000 is an image un-rectification step 1070. The image un-rectification step 1070 applies the inverse of the rectification maps 1037 from the image rectification step 1030 to transform the intermediate inter-view prediction 1065 back to the original image coordinates (i.e., that of image 205). This forms the final output of the system 1000, which is a refined version of the inter-view prediction 437 appeared in both FIGS. 4 and 10.

After the inter-view predicted image 437 is refined by the inter-view refinement module 460, the processing returns to the Wyner-Ziv decoder module 438 for another iteration of decoding operation between the system 500 and the system 1000. This process repeats until the reliability of the decoded image 448 exceeds a predetermined threshold, or a maximum number of iterations have been reached. The maximum number of iterations can be counted within the reliability check 450, and for example may be preset to 8 iterations. The final output from the iterative operation in the module 430 is the most recently decoded image 448 from the Wyner-Ziv decoder module 438, which represents the final approximation of the captured by the DVC camera 122 at the first viewpoint. This concludes the description of the inter-view refinement module in FIG. 10.

Computer Implementation

Figure 9A:
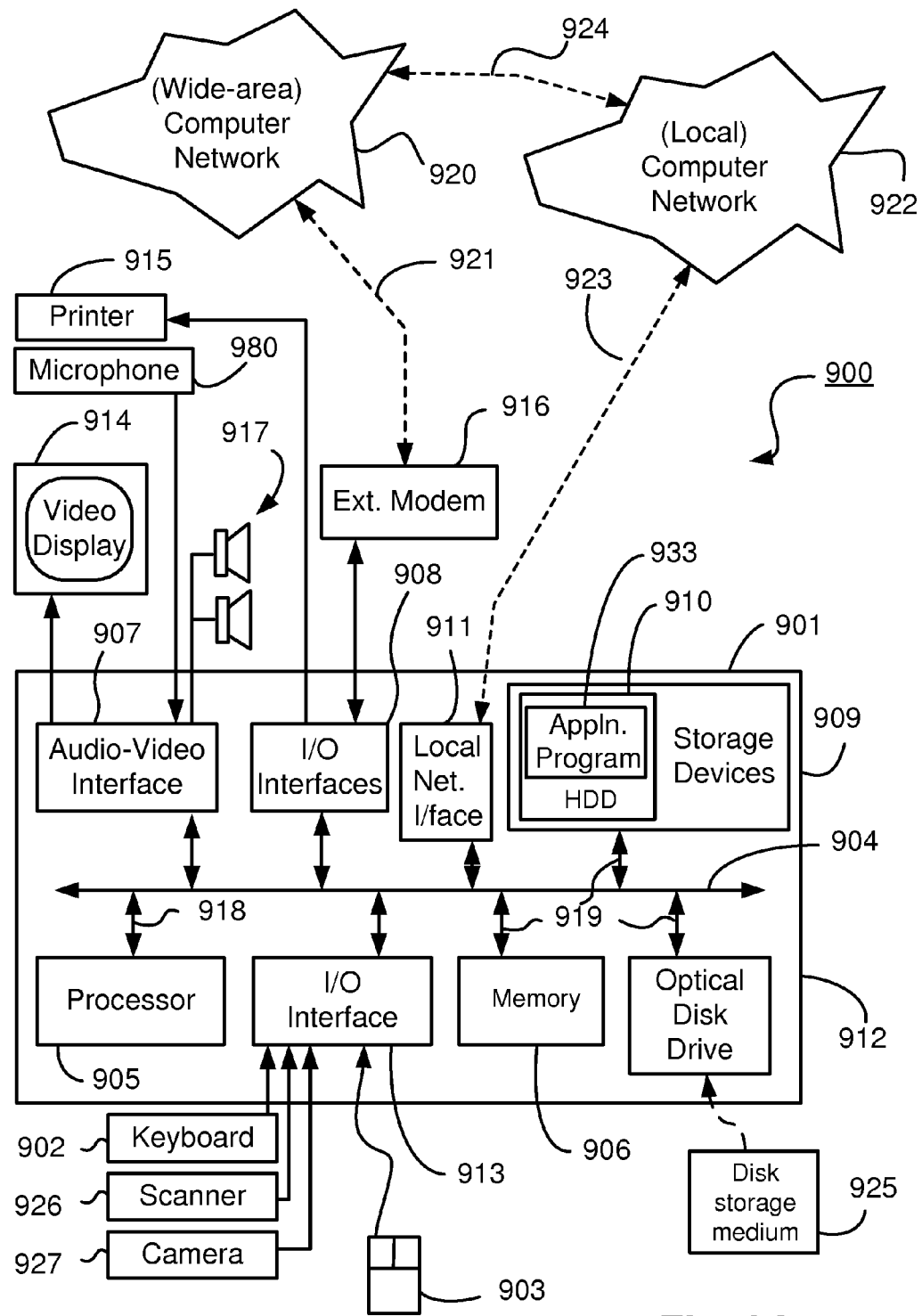
FIGS. 9A and 9B are schematic block diagrams of a computer system in which the system components shown in FIGS. 2A, 2B, 3, 4, 5, 6, 7, 8, and 10 may be implemented.
Figure 9B:
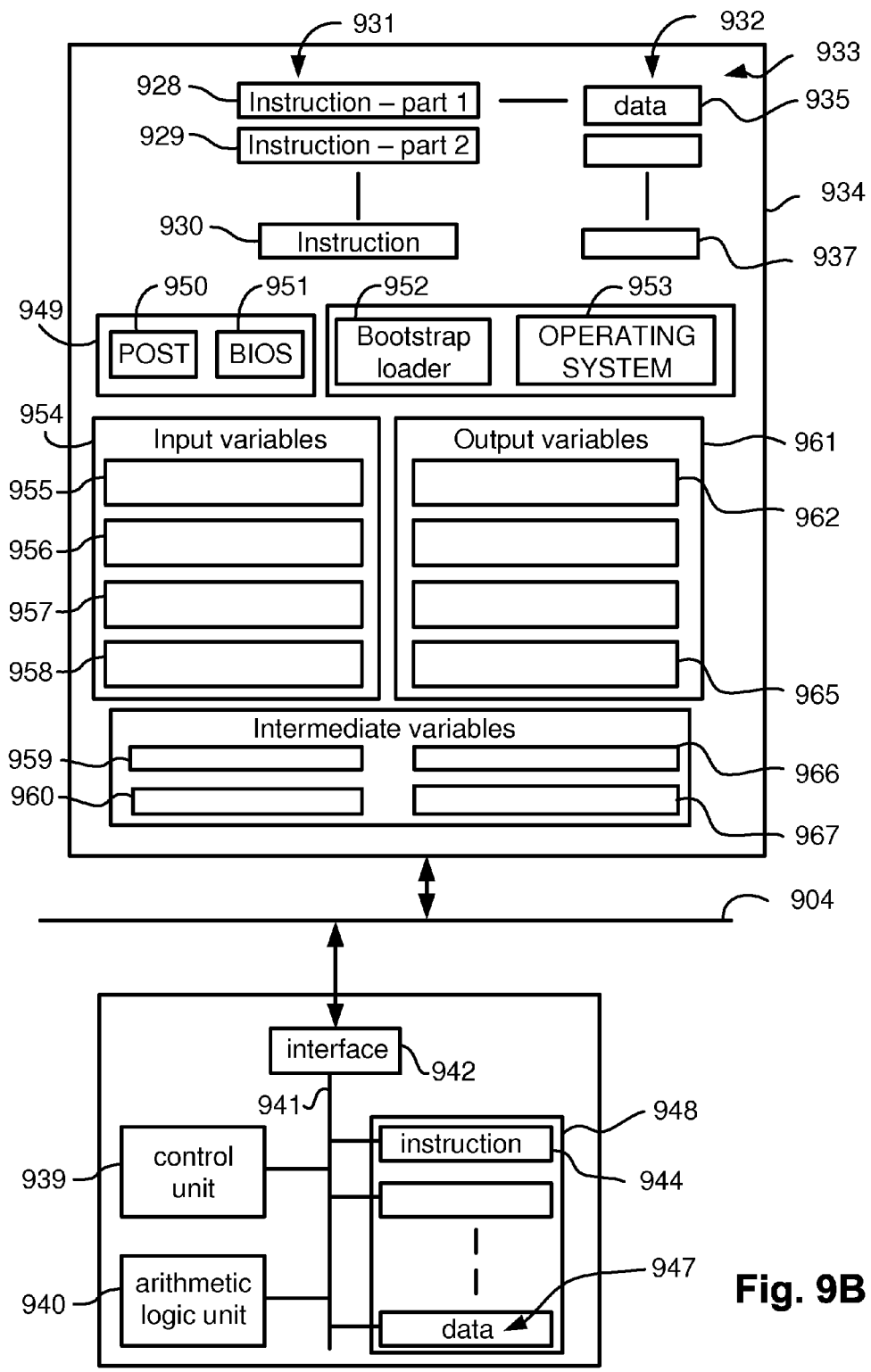

The systems 200, 250, and 400 shown in FIGS. 2A, 2B, and 4 respectively, may be implemented using a computer system 900, such as that shown in FIGS. 9A and 9B, where the encoder 200, the encoder 250, and the decoder 400 may be implemented as software, such as one or more application programs executable within the computer system 900. The software may be stored in a computer readable medium, including the storage devices described hereinafter, for example. The software is loaded into the computer system 900 from the computer readable medium, and then executed by the computer system 900. A computer readable medium having such software or computer program recorded on the medium is a computer program product.

FIGS. 9A and 9B collectively form a schematic block diagram of a general-purpose computer system 900, upon which the various arrangements described can be practiced.

As seen in FIG. 9A, the computer system 900 is formed by a computer module 901, input devices such as a keyboard 902, a mouse pointer device 903, a scanner 926, a camera 927, and a microphone 980, and output devices including a printer 915, a display device 914 and loudspeakers 917. An external Modulator-Demodulator (Modem) transceiver device 916 may be used by the computer module 901 for communicating to and from a communications network 920 via a connection 921. The network 920 may be a wide-area network (WAN), such as the Internet or a private WAN. Where the connection 921 is a telephone line, the modem 916 may be a traditional "dial-up" modem. Alternatively, where the connection 921 is a high capacity (e.g.: cable) connection, the modem 916 may be a broadband modem. A wireless modem may also be used for wireless connection to the network 920.

The computer module 901 typically includes at least one processor unit 905, and a memory unit 906 for example formed from semiconductor random access memory (RAM) and semiconductor read only memory (ROM). The computer module 901 also includes an number of input/output (I/O) interfaces including an audio-video interface 907 that couples to the video display 914, loudspeakers 917 and microphone 980, an I/O interface 913 for the keyboard 902, mouse 903, scanner 926, camera 927 and optionally a joystick (not illustrated), and an interface 908 for the external modem 916 and printer 915. In some implementations, the modem 916 may be incorporated within the computer module 901, for example within the interface 908. The computer module 901 also has a local network interface 911 which, via a connection 923, permits coupling of the computer system 900 to a local computer network 922, known as a Local Area Network (LAN). As also illustrated, the local network 922 may also couple to the wide network 920 via a connection 924, which would typically include a so-called "firewall" device or device of similar functionality. The interface 911 may be formed by an Ethernet™ circuit card, a Bluetooth™ wireless arrangement or an IEEE 802.11 wireless arrangement.

The interfaces 908 and 913 may afford either or both of serial and parallel connectivity, the former typically being implemented according to the Universal Serial Bus (USB) standards and having corresponding USB connectors (not illustrated). Storage devices 909 are provided and typically include a hard disk drive (HDD) 910. Other storage devices such as a floppy disk drive and a magnetic tape drive (not illustrated) may also be used. An optical disk drive 912 is typically provided to act as a non-volatile source of data. Portable memory devices, such optical disks (e.g.: CD-ROM, DVD), USB-RAM, and floppy disks for example may then be used as appropriate sources of data to the system 900.

The components 905 to 913 of the computer module 901 typically communicate via an interconnected bus 904 and in a manner that results in a conventional mode of operation of the computer system 900 known to those in the relevant art. Examples of computers on which the described arrangements can be practised include IBM-PC's and compatibles, Sun Sparcstations, Apple Mac™ or a like computer systems evolved therefrom.

The method of processing multi-view digital images each comprising a plurality of pixels may be implemented using the computer system 900 wherein the processes may be implemented as one or more software application programs 933 executable within the computer system 900. In particular, the steps of the method of processing multi-view digital images each comprising a plurality of pixels are effected by instructions 931 in the software 933 that are carried out within the computer system 900. The software instructions 931 may be formed as one or more code modules, each for performing one or more particular tasks. The software may also be divided into two separate parts, in which a first part and the corresponding code modules performs the methods of processing multi-view digital images each comprising a plurality of pixels and a second part and the corresponding code modules manage a user interface between the first part and the user.

The software 933 is generally loaded into the computer system 900 from a computer readable medium and is then typically stored in the HDD 910, as illustrated in FIG. 9A, or the memory 906, after which the software 933 can be executed by the computer system 900. In some instances, the application programs 933 may be supplied to the user encoded on one or more CD-ROM 925 and read via the corresponding drive 912 prior to storage in the memory 910 or 906. Alternatively the software 933 may be read by the computer system 900 from the networks 920 or 922 or loaded into the computer system 900 from other computer readable media. Computer readable storage media refers to any storage medium that participates in providing instructions and/or data to the computer system 900 for execution and/or processing. Examples of such storage media include floppy disks, magnetic tape, CD-ROM, a hard disk drive, a ROM or integrated circuit, USB memory, a magneto-optical disk, or a computer readable card such as a PCMCIA card and the like, whether or not such devices are internal or external of the computer module 901. Examples of computer readable transmission media that may also participate in the provision of software, application programs, instructions and/or data to the computer module 901 include radio or infra-red transmission channels as well as a network connection to another computer or networked device, and the Internet or Intranets including e-mail transmissions and information recorded on Websites and the like.

The second part of the application programs 933 and the corresponding code modules mentioned above may be executed to implement one or more graphical user interfaces (GUIs) to be rendered or otherwise represented upon the display 914. Through manipulation of typically the keyboard 902 and the mouse 903, a user of the computer system 900 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 917 and user voice commands input via the microphone 980.

FIG. 9B is a detailed schematic block diagram of the processor 905 and a "memory" 934. The memory 934 represents a logical aggregation of all the memory devices (including the HDD 910 and semiconductor memory 906) that can be accessed by the computer module 901 in FIG. 9A.

When the computer module 901 is initially powered up, a power-on self-test (POST) program 950 executes. The POST program 950 is typically stored in a ROM 949 of the semiconductor memory 906. A program permanently stored in a hardware device such as the ROM 949 is sometimes referred to as firmware. The POST program 950 examines hardware within the computer module 901 to ensure proper functioning, and typically checks the processor 905, the memory (909, 906), and a basic input-output systems software (BIOS) module 951, also typically stored in the ROM 949, for correct operation. Once the POST program 950 has run successfully, the BIOS 951 activates the hard disk drive 910. Activation of the hard disk drive 910 causes a bootstrap loader program 952 that is resident on the hard disk drive 910 to execute via the processor 905. This loads an operating system 953 into the RAM memory 906 upon which the operating system 953 commences operation. The operating system 953 is a system level application, executable by the processor 905, to fulfil various high level functions, including processor management, memory management, device management, storage management, software application interface, and generic user interface.

The operating system 953 manages the memory (909, 906) to ensure that each process or application running on the computer module 901 has sufficient memory in which to execute without colliding with memory allocated to another process. Furthermore, the different types of memory available in the system 900 must be used properly so that each process can run effectively. Accordingly, the aggregated memory 934 is not intended to illustrate how particular segments of memory are allocated (unless otherwise stated), but rather to provide a general view of the memory accessible by the computer system 900 and how such is used.

The processor 905 includes a number of functional modules including a control unit 939, an arithmetic logic unit (ALU) 940, and a local or internal memory 948, sometimes called a cache memory. The cache memory 948 typically includes a number of storage registers 944-946 in a register section. One or more internal buses 941 functionally interconnect these functional modules. The processor 905 typically also has one or more interfaces 942 for communicating with external devices via the system bus 904, using a connection 918.

The application program 933 includes a sequence of instructions 931 that may include conditional branch and loop instructions. The program 933 may also include data 932, which is used in execution of the program 933. The instructions 931 and the data 932 are stored in memory locations 928-930 and 935-937 respectively. Depending upon the relative size of the instructions 931 and the memory locations 928-930, a to particular instruction may be stored in a single memory location as depicted by the instruction shown in the memory location 930. Alternately, an instruction may be segmented into a number of parts each of which is stored in a separate memory location, as depicted by the instruction segments shown in the memory locations 928-929.

In general, the processor 905 is given a set of instructions which are executed therein. The processor 905 then waits for a subsequent input, to which it reacts to by executing another set of instructions. Each input may be provided from one or more of a number of sources, including data generated by one or more of the input devices 902, 903, data received from an external source across one of the networks 920, 922, data retrieved from one of the storage devices 906, 909 or data retrieved from a storage medium 925 inserted into the corresponding reader 912. The execution of a set of the instructions may in some cases result in output of data. Execution may also involve storing data or variables to the memory 934.

The disclosed arrangements use input variables 954, which are stored in the memory 934 in corresponding memory locations 955-958. The arrangements produce output variables 961, which are stored in the memory 934 in corresponding memory locations 962-965. Intermediate variables may be stored in memory locations 959, 960, 966 and 967.

The register section 944-947, the arithmetic logic unit (ALU) 940, and the control unit 939 of the processor 905 work together to perform sequences of micro-operations needed to perform "fetch, decode, and execute" cycles for every instruction in the instruction set making up the program 933. Each fetch, decode, and execute cycle comprises:

(a) a fetch operation, which fetches or reads an instruction 931 from a memory location 928;

(b) a decode operation in which the control unit 939 determines which instruction has been fetched; and (c) an execute operation in which the control unit 939 and/or the ALU 940 execute the instruction.

Thereafter, a further fetch, decode, and execute cycle for the next instruction may be executed. Similarly, a store cycle may be performed by which the control unit 939 stores or writes a value to a memory location 932.

Each step or sub-process in the processes of FIGS. 2A, 2B, and 4 is associated with one or more segments of the program 933, and is performed by the register section 944-947, the ALU 940, and the control unit 939 in the processor 905 working together to perform the fetch, decode, and execute cycles for every instruction in the instruction set for the noted segments of the program 933.

The encoder 200, the encoder 250, and the decoder 400 of FIGS. 2A, 2B, and 4, respectively, may alternatively be implemented in dedicated hardware such as one or more integrated circuits. Such dedicated hardware may include Field-programmable gate array (FPGA), application-specific integrated circuit (ASIC), graphic processors, digital signal processors, or one or more microprocessors and associated memories.

In one implementation, the encoder 200, the encoder 250, and the decoder 400 are implemented within a camera, where the encoder 200, the encoder 250, and the decoder 400 may be implemented as software being executed by a processor of the camera. Alternatively, such components may be implemented using dedicated hardware within the camera, or by a combination of hardware and software.

In another implementation, only the encoder 200 and the encoder 250 are implemented within a camera. The encoder 200 and the encoder 250 may be implemented as software executing in a processor of the camera, or implemented using dedicated hardware within the camera.

In yet a further implementation, the encoder 200 and the encoder 250 are implemented separately within two independent cameras. The encoder 200 and the encoder 250 may be implemented as software executing in a processor of the camera, or implemented using dedicated hardware within the camera.

A number of methods, apparatus, and computer program products for processing multi-view digital images each comprising a plurality of pixels have been disclosed with reference to embodiments of the invention. The embodiments of the invention are applicable to the computer- and data-processing industries, amongst others. The foregoing describes only some embodiments of the present invention, and modifications and/or changes can be made thereto without departing from the scope and spirit of the invention, the embodiments being illustrative and not restrictive.

We claim:

1. A method of joint decoding of images from different viewpoints using distributed coding techniques, said method comprising the steps of:

receiving a first set of features from a first image and error correction bits corresponding to said first image, said first image being obtained at a first viewpoint;

receiving a second image obtained at a second viewpoint and a second set of features from said second image corresponding to said second viewpoint, said second viewpoint being different from said first viewpoint;

determining an approximation of said first image at said first viewpoint based on said first and second sets of features and said second image at said second viewpoint;

jointly decoding said approximation of said first image using said error correction bits;

determining a reliability measure of said decoded approximation of said first image, the reliability measure being an indication of a confidence of values of bits of the decoded approximation;

refining said approximation of said first image iteratively based on said first and second sets of features and said second image and said decoded approximation if the reliability measure is below a predetermined threshold, wherein said approximation of said first image is iteratively refined until the reliability measure exceeds the predetermined threshold; and outputting said decoded approximation as a decoded image where the reliability measure exceeds the predetermined threshold.

2. A method according to claim 1, wherein the determining step comprises the steps of:

estimating an affine transformation between said first and second sets of features;

adjusting at least one set of features based on said affine transformation;

generating a set of feature correspondences between said first and second sets of transformed features based on the positional difference between a first feature in said first set of transformed features and a second feature in said second set of transformed features;

refining said set of feature correspondences based on an approximation of epi-polar geometry and said first and second sets of transformed features.

3. A method according to claim 2 wherein the refining step is performed iteratively.

4. A method according to claim 2 wherein the refining step comprises the steps of:

(a) using the set of feature correspondences to estimate the approximation of epi-polar geometry;

(b) determining a proximity measure between the first and second set of transformed features wherein the proximity measure is a weighted sum of a function of positional difference between a first feature in said first image and a second feature in said second image, and at least a function of a distance measured from said second feature to the corresponding epi-polar line defined by said first feature;

(c) determining the refined feature correspondence between each of a plurality of features in the first set of transformed features to a feature in the second set of transformed features based on the proximity measure; and (d) setting the refined feature correspondence as the set of feature correspondences and repeating steps (a) to (c) based on the number of refined feature correspondences.

5. A method according to claim 4 wherein the weights used in the proximity measure are functions of the pixel coordinates of said first and second features.

6. A method according to claim 4 wherein the positional difference and the distance measure are represented by Euclidean distance.

7. A method according to claim 1 wherein the first image is obtained from a DVC camera at a first resolution and the second image is obtained from a conventional camera at a second resolution, the second image being subject to intra-frame encoding.

8. A method according to claim 7 where the first resolution is the same as, or lower than, the second resolution.

9. An imaging system for forming an image of a scene, said system comprising:
- a decoder;
- at least one first camera for imaging the scene from a first viewpoint and for communicating first image data including at least a first set of feature points and error correction bits corresponding to a first image obtained at the first viewpoint to said decoder; and
- at least one second camera for imaging the scene from a second viewpoint and for communicating second image data of a second image obtained from the second viewpoint to the decoder, the first and second images at least partly overlapping;
- the decoder being configured to receive the first and second image data, and comprising:
  - an extractor configured to extract a second set of feature points from the second image;
  - an estimator adapted to estimate at least one image region correspondence between the images from said first and second viewpoints based on said first set of feature points and said second set of feature points;
  - a joint decoder for determining a decoded image and a reliability measure based on said at least one image region correspondence and said error correction bits, the reliability measure being an indication of a confidence of values of bits of the decoded image; and
  - a reliability iterator for refining said image region correspondence iteratively based on said reliability measure, said first and second sets of feature points, said second image data and the decoded image, if said reliability measure is below a predetermined threshold, wherein said at least one image region correspondence is iteratively refined until the reliability measure exceeds the predetermined threshold; and
  - an output for outputting the decoded image where the reliability measure exceeds the predetermined threshold.

10. Apparatus for joint decoding of images from different viewpoints using distributed coding techniques, said apparatus comprising:
- an input for receiving a first set of features from a first image and error correction bits corresponding to said first image, said first image obtained at a first viewpoint;
- an input for receiving a second image obtained at a second viewpoint and a second set of features from said second image corresponding to said second viewpoint, said second viewpoint being different from said first viewpoint;
- a prediction arrangement for determining an approximation of said first image at said first viewpoint based on said first and second sets of features and said second image at said second viewpoint;
- a joint decoder for jointly decoding said approximation of said first image using said error correction bits to from a decoded approximation;
- a reliability arrangement for determining a reliability measure of said decoded approximation of said first image, the reliability measure being an indication of a confidence of values of bits of the decoded approximation; and
- a refinement arrangement for iteratively refining said approximation of said first image based on the said first and second sets of features and said second image and said decoded approximation if the reliability measure is below a predetermined threshold, such that said approximation of said first image is iteratively refined until the reliability measure exceeds the predetermined threshold; and
- an output for outputting said decoded approximation as a decoded image where the reliability measure exceeds the predetermined threshold.

11. Apparatus according to claim 10, wherein the prediction arrangement comprises:
- an estimator for estimating an affine transformation between said first and second sets of features;
- an adjustor for adjusting at least one set of features based on said affine transformation;
- a generator for generating a set of feature correspondences between said first and second sets of transformed features based on the positional difference between a first feature in said first set of transformed features and a second feature in said second set of transformed features; and
- a refiner for iteratively refining said set of feature correspondences based on an approximation of epi-polar geometry and said first and second sets of transformed features.

12. Apparatus according to claim 11 wherein the refiner comprises:
- an estimator for estimating the approximation of epi-polar geometry using the set of feature correspondences;
- first determiner for determining a proximity measure between the first and second set of transformed features wherein the proximity measure is a weighted sum of a function of positional difference between a first feature in said first image and a second feature in said second image, and at least a function of a distance measured from said second feature to the corresponding epi-polar line defined by said first feature;
- second determiner for determining the refined feature correspondence between each of a plurality of features in the first set of transformed features to a feature in the second set of transformed features based on the proximity measure; and
- a process for setting the refined feature correspondence as the set of feature correspondences and repeating steps (a) to (c) based on the number of refined feature correspondences.

13. Apparatus according to claim 12 wherein the weights used in the proximity measure are functions of the pixel coordinates of said first and second features, and the positional difference and the distance measure are represented by Euclidean distance.

14. Apparatus according to claim 10 wherein the first image is obtained from a DVC camera at a first resolution and the second image is obtained from a conventional camera at a second resolution, the second image being subject to intra-frame encoding, the first resolution being no more than the second resolution.

15. A non-transitory computer readable storage medium having a computer program recorded thereon, the program being executable by computer apparatus for joint decoding of images from different viewpoints using distributed coding techniques, said program comprising:
- code for receiving a first set of features from a first image and error correction bits corresponding to said first image, said first image being obtained at a first viewpoint;
- code for receiving a second image obtained at a second viewpoint and a second set of features from said second image corresponding to said second viewpoint, said second viewpoint being different from said first viewpoint;

code for determining an approximation of said first image at said first viewpoint based on said first and second sets of features and said second image at said second viewpoint;

code for jointly decoding said approximation of said first image using said error correction bits to form a decoded approximation;

code for determining a reliability measure of said decoded approximation of said first image, the reliability measure being an indication of a confidence of values of bits of said approximation;

code for refining said approximation of said first image iteratively based on the said first and second sets of features and said second image and said decoded approximation if the reliability measure is below a predetermined threshold, wherein said approximation of said first image is iteratively refined until the reliability measure exceeds the predetermined threshold; and code for outputting said decoded approximation as a decoded image where the reliability measure exceeds the predetermined threshold.

16. A non-transitory computer readable storage medium according to claim 15, wherein the code for determining comprises:

code for estimating an affine transformation between said first and second sets of features;

code for adjusting at least one set of features based on said affine transformation;

code for generating a set of feature correspondences between said first and second sets of transformed features based on the positional difference between a first feature in said first set of transformed features and a second feature in said second set of transformed features;

code for iteratively refining said set of feature correspondences based on an approximation of epi-polar geometry and said first and second sets of transformed features.

17. A non-transitory computer readable storage medium according to claim 16 wherein the code for refining comprises:

code for estimate the approximation of epi-polar geometry using the set of feature correspondences;

code for determining a proximity measure between the first and second set of transformed features wherein the proximity measure is a weighted sum of a function of positional difference between a first feature in said first image and a second feature in said second image, and at least a function of a distance measured from said second feature to the corresponding epi-polar line defined by said first feature;

code for determining the refined feature correspondence between each of a plurality of features in the first set of transformed features to a feature in the second set of transformed features based on the proximity measure; and code for setting the refined feature correspondence as the set of feature correspondences and repeating steps (a) to (c) based on the number of refined feature correspondences.

18. A non-transitory computer readable storage medium according to claim 17 wherein the weights used in the proximity measure are functions of the pixel coordinates of said first and second features and the positional difference and the distance measure are represented by Euclidean distance.

19. A non-transitory computer readable storage medium according to claim 15 wherein the first image is obtained from a DVC camera at a first resolution and the second image is obtained from a conventional camera at a second resolution, the second image being subject to intra-frame encoding.

20. A non-transitory computer readable storage medium according to claim 19 wherein the first resolution is the same as, or lower than, the second resolution.

* * * * *